United States Patent
Mogensen et al.

(10) Patent No.: US 10,787,217 B2
(45) Date of Patent: Sep. 29, 2020

(54) TILTING MECHANISM FOR A WHEELED VEHICLE

(71) Applicant: Butchers & Bicycles ApS, Copenhagen (DK)

(72) Inventors: Morten Mogensen, Hvidovre (DK); Morten Wagener, Copenhagen (DK)

(73) Assignee: BUTCHERS & BICYCLES APS (DK)

( * ) Notice: Subject to any disclaimer, the term of this patent is extended or adjusted under 35 U.S.C. 154(b) by 604 days.

(21) Appl. No.: 15/033,914

(22) PCT Filed: Nov. 7, 2014

(86) PCT No.: PCT/EP2014/074050
§ 371 (c)(1),
(2) Date: May 3, 2016

(87) PCT Pub. No.: WO2015/067760
PCT Pub. Date: May 14, 2015

(65) Prior Publication Data
US 2016/0272264 A1    Sep. 22, 2016

(30) Foreign Application Priority Data

Nov. 8, 2013  (DK) .................................. 2013 00640

(51) Int. Cl.
*B62K 5/10*     (2013.01)
*B62K 5/05*     (2013.01)
(Continued)

(52) U.S. Cl.
CPC .............. *B62K 5/10* (2013.01); *B60G 21/007* (2013.01); *B62D 9/02* (2013.01); *B62D 61/065* (2013.01);
(Continued)

(58) Field of Classification Search
CPC ... B62K 5/10; B62K 5/05; B62K 5/08; B62K 5/027; B62K 5/02; B62K 5/00;
(Continued)

(56) References Cited

U.S. PATENT DOCUMENTS 2,968,492 A * 1/1961 Nallinger ................. B60G 3/20
267/222
4,227,589 A * 10/1980 Chika .................... B62K 13/06
180/205.7

(Continued)

FOREIGN PATENT DOCUMENTS

| CN | 1898122 A | 1/2007 |
| DE | 19524802 A1 | 4/1997 |
| DE | 102006039457 B4 * | 3/2008 |

OTHER PUBLICATIONS

International Search Report for PCT International Application No. PCT/EP2014/074050.
(Continued)

*Primary Examiner* — Keith J Frisby
(74) *Attorney, Agent, or Firm* — Merek, Blackmon & Voorhees, LLC

(57) ABSTRACT

This invention relates to a tilting mechanism for wheeled vehicles such as bicycles both electrical and manually powered, motorcycles, mopeds, scooters and the like. The wheeled vehicle, preferably with three wheels or more, driving like a 2-in-line vehicle and handles the same way in the turns and when driving straight. The tilting mechanism for a multiple wheeled vehicle, comprising a tilting mechanism that allows for leaning body and wheels into a turn and independent adjustment of the turning radius, while inducing an effect to the two front wheels similar to Ackerman steering compensation. The principle of the tilting mechanism is a parallelogram structure, which comprises a top rod, a bottom rod and a pair of connecting rods, pivotally
(Continued)

connected to each other. To each of the connecting rods a pair of steering elements is pivotally connected and on two steering elements a pair of wheels is connected.

17 Claims, 24 Drawing Sheets

(51) Int. Cl.
| | |
|---|---|
| *B62K 5/08* | (2006.01) |
| *B62K 5/027* | (2013.01) |
| *B62M 6/40* | (2010.01) |
| *B62D 9/02* | (2006.01) |
| *B62D 61/06* | (2006.01) |
| *B62K 7/04* | (2006.01) |
| *B60G 21/00* | (2006.01) |
| *B62K 5/00* | (2013.01) |

(52) U.S. Cl.
CPC ............... *B62K 5/027* (2013.01); *B62K 5/05* (2013.01); *B62K 5/08* (2013.01); *B62K 7/04* (2013.01); *B62M 6/40* (2013.01); *B60G 2300/122* (2013.01); *B60G 2300/45* (2013.01); *B62K 2005/001* (2013.01)

(58) Field of Classification Search
CPC ............ B62K 2005/001; B60G 21/007; B60G 2300/45; B60G 2300/122; B62M 6/40; B62D 9/02; B62D 61/06; B62D 61/065
USPC .............................. 280/124.103, 62; 180/210
See application file for complete search history.

(56) References Cited

U.S. PATENT DOCUMENTS

| | | | | |
|---|---|---|---|---|
| 4,767,130 | A * | 8/1988 | Fu-Chao | A61G 5/003 280/202 |
| 4,917,396 | A * | 4/1990 | Meneses | B62K 5/05 224/415 |
| 5,762,351 | A * | 6/1998 | SooHoo | B60G 21/007 180/210 |
| 6,402,174 | B1 | 6/2002 | Maurer | |
| 7,487,985 | B1 | 2/2009 | Mighell | |
| 2008/0258416 | A1 | 10/2008 | Wilcox | |
| 2009/0184488 | A1* | 7/2009 | Dixon | B62K 3/005 280/202 |
| 2012/0181765 | A1* | 7/2012 | Hill | B62K 5/027 280/62 |

OTHER PUBLICATIONS

International Search Report for PCT International Application No. PCT/EP2014/074050 dated Mar. 3, 2015.
Machine generated English language translation of CN1898122A.
Chinese Office Action dated Feb. 20, 2019 issued in connection with Application No. 201480061149.9 and English language translation.
Chinese Office Action dated Nov. 14, 2019 issued in connection with Application No. 201480061149.9 and English language translation.

* cited by examiner

TILTING MECHANISM FOR A WHEELED VEHICLE

CROSS REFERENCE TO RELATED APPLICATIONS

This application is a 35 USC 371 application of International PCT Patent Application No. PCT/EP2014/074050, filed on Nov. 7, 2014, which claims priority to Denmark Patent Application PA 2013 00640 8, filed Nov. 8, 2013; all of the contents of which are hereby incorporated by reference herein in their entireties.

FIELD OF INVENTION

This invention relates to a tilting mechanism for wheeled vehicles such as bicycles both electrical and manually powered, motorcycles, mopeds, scooters and the like. More particularly, this invention relates to a stable, preferable three-wheeled vehicle that offers maneuverability characteristics that are substantially similar to those of an in-line, two-wheeled vehicle. Thus in more detail the invention relates to a tilting mechanisms for multi-wheeled vehicles generally comprising a longitudinal main frame and at least one rear wheel, the main frame being tiltable from side to side defining a range of movement, and two side wheels each having a center plane and a pair of wheel axis elements being connected to the wheels, the tilting mechanism comprising a pair of steering elements adapted to be connected to the wheel axis elements of the side wheels, the steering elements further comprising a steering aggregate adapted for being connected to said main frame and controlling the position of the side wheels.

BACKGROUND OF INVENTION

Many types of arrangements have been proposed for leaning body and wheels into a turn in order to increase a vehicle's stability by counteracting the concerning forces that tend to make vehicles unstable during turns and tip over or throw out an operator.

Maurer, U.S. Pat. No. 6,402,174 B1 and Ellsässer, DE 195 24 802 A1, show leanable vehicles with two turnable front wheels but with a tough steering and scrubbing from the wheels when steering, which is uncomfortable and demands a relatively high force to turn the wheels.

Furthermore the wheels are unsteady during turning and straight ahead driving and the steering will when driving over bumps be affected by unintended forces.

Mighell, U.S. Pat. No. 7,487,985 B1 shows a leanable vehicle with two turnable front wheels and a parallelogram structure. This solution has a wheel steering axis, which is found in the center of the wheel plane, so that the wheel center plane and the steering axis are arranged to be parallel with each other. This results in a difficult off center plane wheel construction where the wheel mounting interface will almost be on the outside of the tires.

Furthermore a desired self-alignment of the steering will not be present and the steering will feel loose and unsecure.

Based on this background it is the object of the invention to provide a tilting mechanism for use in a multiple-wheeled vehicles, that not only combines the qualities of a tilting multiple-wheeled vehicle in order to create stability by counteracting the forces influencing the vehicle, but also improves the tilting properties of such vehicles. Furthermore it is the object to provide a tilting mechanism having a steering axis that goes towards meeting the center of the wheel to ensure self-alignment, natural steering feeling and safe behavior.

SUMMARY OF THE INVENTION

This and further objects are met by a tilting mechanism further comprising a parallelogram structure having a floating top and bottom rod each comprising two ends, laterally spaced from each other, and a pair of connecting rods arranged in each end of the top and bottom rods, the top and bottom rods having three pivot joints, one in each end and one at the center, and the top and bottom rods being arranged to pivot about the pivot joints at the center and adapted for being connected to the main frame by these centre pivot joints, the connecting rods being pivotally connected to the pivot joints at each end of said top and bottom rods, wherein each of said steering elements defines a steering axis, having an angle to said center plane of the wheels, and said steering elements being connected to said connecting rods so that the steering axes intersect at least said pivot joints at the ends of the top rod.

With a tilting mechanism of this kind a tilting mechanism that allows for leaning a body and wheels into a turn, while providing an independent adjustment of the turning radius, while inducing an effect to the two front wheels similar to Ackerman steering compensation (Gillespie, 1992, ISBN 9781560911999), where the inside wheel turns more sharply than the outside wheel, reducing scrubbing of tires during turns, this when turning the wheels at any angle and this when tilting the vehicle in any angle and any combination of the tilt and turn, is provided for.

The construction of the parallelogram with the steering elements defining a steering axis and being arranged to have an angle to the center plane of the wheels, where said steering elements is connected to the connecting rods so that the steering axis intersect at least said pivot joints at the ends of the top rod, has the effect that when installed on a multiple-wheeled vehicle, the tilting mechanism provides the multiple-wheeled vehicle with a steering mechanism similar to that of a normal bicycle. That is the parallelogram structure provided with the steering axis having an angle with the center plane of the side wheels creates the effect of the multiple-wheeled vehicle leaning towards the direction of turning, when for example driving through a curve on a road, while maintaining the steering compensation. Furthermore this specific structure of the parallelogram provided provides the possibly of using wheels having a center mounted hub construction such as those used on a bicycle. When any kind of vehicle drives the so called scrub radius should preferably be close to zero in order to obtain a proper steering compensation. Such scrub radius is normally obtained by placing the steering elements, also referred to as kingpins, within the hub of a wheel, which is however not possible when used in a center mounted hub construction, such as those used on for example bicycles. The preferred scrub radius is thus easily obtained by the parallelogram structure of the invention where the steering elements are displaced from the center of the hub such as to create a steering axis having an angle with the center plane of the wheel, where the scrub radius is near to 0.

It should be noted that the steering elements could preferably be in the form of an L-shape so that the steering elements and the connecting rods in a assembled condition forms a triangle, the triangle having its top at the connection between the connecting rod and the steering element at the pivot joint at the top rod.

The connection of the steering elements to the pivot joint provided in connection with the top rod, could also be displaced, so that the steering element has a distance to the end of the top rod, while maintaining the slope of steering elements so as to form the steering axis having an angle to the center plane of the side wheel.

Furthermore the center of the top and bottom rod is pivotally connected to the main frame, also to be referred to as the vehicle hull, which at any movement is parallel to the connecting rods so that a combined steering an control of the tilting mechanism are obtained.

Further objects and advantages of having a tilting mechanism according to the invention are
- to provide a multiple wheeled vehicle driving like a 2-in-line vehicle and handles the same way in the turns and when driving straight,
- the steering mechanism being similar to Ackermann steering both in straight and tilted position,
- to provide for a greater stability and control while turning, especially at higher velocity,
- improved possibility to lean and steer individually of each other,
- providing greater comfort for vehicle occupant(s) when turning,
- reducing the likelihood of vehicle rollover when turning,
- reducing the torsional chassis or frame stress,
- improving the steering mechanism when traveling on highly pitched surfaces where the vehicle lean can be adjusted, by the motion of the driver, for balance, better ergonomics and comfort unlike traditional multitrack vehicle designs,
- improving the steering mechanism in rough terrains, where the vehicle balances like a bicycle since the tilting mechanism conforms to the terrain thereby easing handling and increasing driver comfort and ergonomics
    - providing greater ability to negotiate bumps with no or less influence on the steering,
    - providing less road shock since the vehicle frame is only constrained in the pitch axis, and
    - providing less need for shock absorbing.

In one preferred embodiment the connecting rods each defines an imaginary axis so that the steering axis forms an angle with said imaginary axis of said connecting rods.

In a vehicle with a steering axis that goes towards meeting the center plane of the wheel on the ground level, the steering of the wheels will feel firm when driving and the self-alignment will feel natural and safe, and this especially when driving at higher velocity.

In another preferred embodiment of the invention, the steering axes, when viewing the wheel from a side, forms an angle with a vertical imaginary line at the point wherein said wheel intersects the ground plane, the angle preferable being positive. With this specific structure of the tilting mechanism the multi-wheeled vehicle is thus not only improved with regard to tilting properties but is also provided with an angle corresponding to a castor angle, so that the directional stability necessary for driving such vehicles is maintained.

Thus a positive angle occurs when the steering axis intersects the ground plane in front of the vertical imaginary line, in which case the multiple-wheeled vehicle is easier to control and self-align.

Further advantages of said steering axes having an angle seen from a side view facing the center plane of the frame, where the angle can lean both to one side or the other is thus handling characteristic is improved with self-alignment, and a greater stability and control while turning, especially at higher velocity.

In a development of either of the embodiments the tilting mechanism may comprise a resilient member operable secured to the tilting mechanism, thus having the effect of providing a greater capacity with regards to loads influencing the tilting mechanism it self and thereby the multi-wheeled vehicle during driving as well as in a non-active driving position. In more detail this is advantageous in that it provides for a greater handling when the multi-wheeled vehicle is loaded with a load, along with a stabilization mechanism of the tilting mechanism, easier handling when rising to vertical apex from leaned position, and a self-standing capability when the vehicle, to which the tilting mechanism is mounted, is not in motion as well as in motion.

In a further development of this embodiment the resilient member may comprise a pair of resilient elements operable positioned between said top and bottom rod on each side of the main frame. By providing a pair of resilient members on each side of the main frame, a symmetrical load bearing as well as stabilisation of the tilting mechanism is achieved.

In yet another development the resilient elements comprises a pair of extension springs operable secured to the tilting mechanism through two pivot points and with an adjustment element to operable extend the springs.

In another embodiment the resilient elements comprises a pair of compression springs operable double acting comprising two structures to hold each spring. This gives the possibility of having adjustable tension on the compression springs, which will cause the tilting mechanism to act more dampened in the close to vertical position. As such the operator will not experience the harmonic oscillations and have to compensate for these in the same extent as single action springs.

In another preferred embodiment of the invention the steering axis and the center plane of said side wheels will always intersect, preferably at a point on the ground plane. This will give a zero scrub radius, which gives a self-aligning effect, and makes handling less sensitive to external forces, which is especially advantageous when driving at high speeds.

In a further development of the embodiments the steering axes and said center planes of said wheels will have a distance to each other at the ground plane while intersecting at a point below ground plane. This will make the handling of the multi-wheeled vehicle more sensitive to inputs from for example an operator steering the multi-wheeled vehicle, road disturbances or other factor influencing the steering, and as such improves steering and handling of the multi-wheeled vehicle at lower speeds.

According to the previous described embodiments of a titling mechanism this mechanism may preferably be installed in a multi-wheeled vehicle. Thus a multi-wheeled vehicle including a tilting mechanism according to any one of the previous embodiments is provided for, where the multi-wheeled vehicle preferably comprises an auxiliary motor. By providing the multi-wheeled vehicle with an auxiliary motor, the ease of driving is improved since especially the speed is enhanced. By mounting the tilting mechanism according to the previous described embodiment of the invention thus provides a stabile driving and leaning of the multi-wheeled vehicle during for example driving through a curve, where the generally know multi-wheeled vehicle tilting mechanism, would not lean in the same direction as the curve.

In a development of this embodiment the auxiliary motor may be an electric motor. By providing the multi-wheeled vehicle with an auxiliary motor, possibly being an electrical motor, the multi-wheeled vehicle may be provided with a driving force for helping the operator or user to an increased propulsion.

Furthermore, the multi-wheeled vehicle may include a platform structure connected to the main frame, and a stabilization mechanism pivotally connected to the platform.

In one embodiment, the multi-wheeled vehicle further includes a compartment element operably secured to the platform and/or the main frame, wherein the compartment is an open or closed compartment, a door in the front of said compartment comprising a locking mechanism, a frame in the top of the compartment, a means of seating comprising a bottom element and a back element, and a room for storage arranged behind said back element.

By providing the multi-wheeled vehicle with a platform, for example in the form of a compartment of this kind, the multi-wheeled vehicle may be used to transport objects and/or living creatures such as humans and animals. Further advantages are that this structure provides a stabile platform that may be fully enclosed and streamlined for speed and comfort. The construction provides stability to the tiltable multi-wheeled vehicle when entering or loading the vehicle and featuring of especially a door provides better accessibility for operator(s) and or users.

Preferably the multi-wheeled vehicle may be a three-wheeled bicycle.

BRIEF DESCRIPTION OF THE DRAWINGS

FIG. 6 is a perspective front view, FIG. 7 is a front view, FIG. 8 is a side view, FIG. 14 is a perspective view, FIG. 15 is a front view of the tilting 3 wheel bicycle with a cargo embodiment where the frame is tilted, FIG. 16 is a front view of the tilting 3 wheel bicycle with a cargo embodiment where the front wheels are turned, FIG. 17 is a front view of the tilting 3 wheel bicycle with a cargo embodiment where the front wheels are turned and the frame is tilted, FIG. 18 is a top view, FIG. 19 is a front view, FIG. 20 is a part view of a perspective view.

DETAILED DESCRIPTION OF PREFERRED EMBODIMENT

Figure 1:
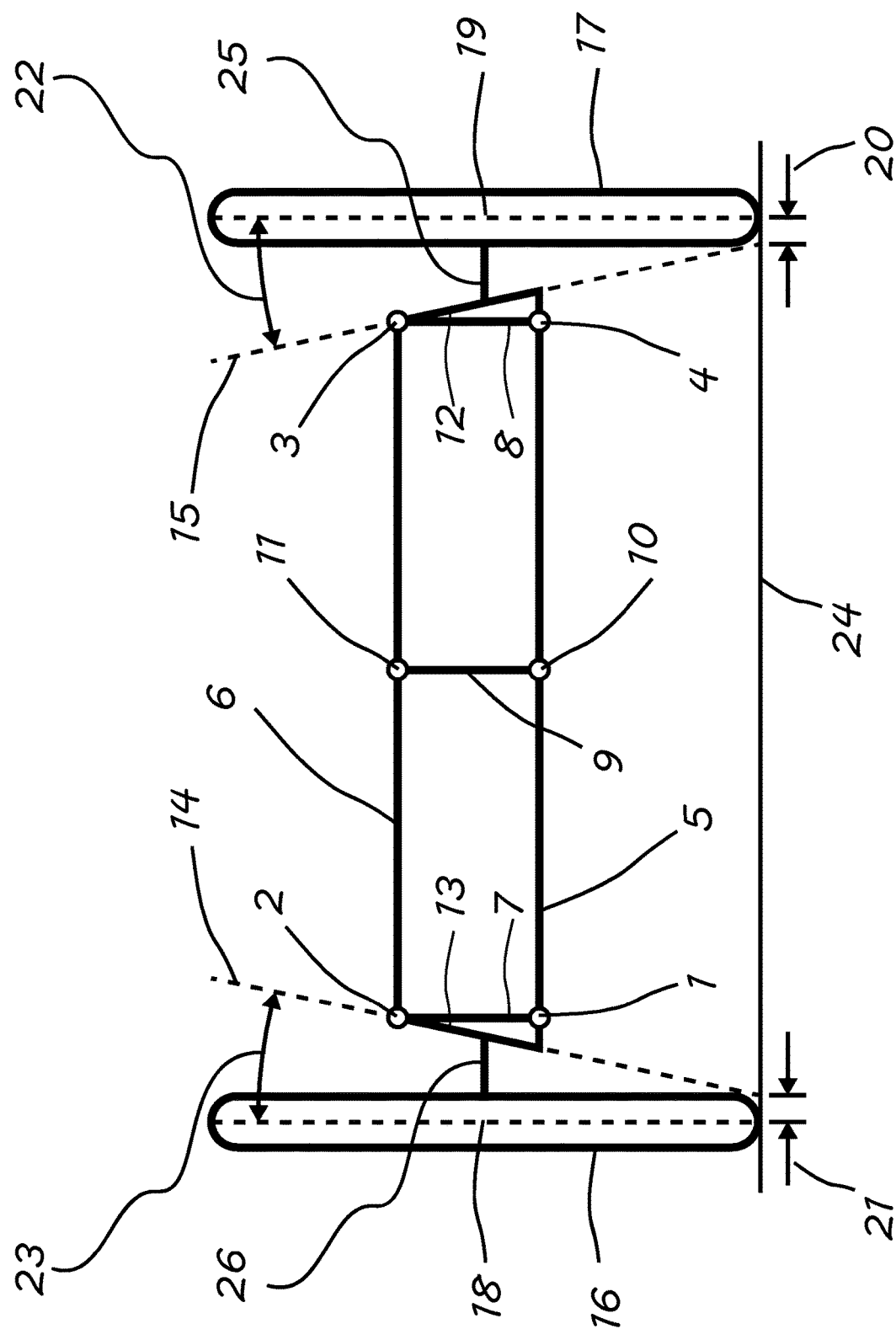
FIG. 1 is a diagrammatic front view of a tilting mechanism in a straight position.

Referring to FIG. 1, which is a diagrammatic front view of a structure for enabling two individual steered wheels to lean with a vehicle hull of the present invention, also called tiling mechanism. The structure is comprised of a linkage mechanism characterized by a parallelogram structure comprising a top rigid floating rod 6, a bottom rigid floating rod 5, a first connecting rigid joint 7 and a second connecting rigid joint 8. Top floating rod 6 and bottom floating rod 5 is at equal length and connecting rod 7 and connecting rod 8 is at equal length. The top floating rod 6 is connected to connecting rod 7 at pivot 2 and to connecting rod 8 at pivot 3. The bottom floating rod 5 is connected to connecting rod 7 at pivot 1 and to connecting rod 8 at pivot 4. A rigid vehicle hull 9 is connected to the parallelogram structure by pivot 11, which is in the center of floating rod 6, and by pivot 10, which is in the center of floating rod 5. This enables the hull 9, connection joint 8 and connection joint 7 to be parallel at any movement. A right side steering element 12 is connected to joint 3 and 4, and a left side steering element 13, which is also referred to as a "kingpin", is connected to joint 1 and 2. The right steering element 12 which is also referred to as a "kingpin", is characterized by a steering axis 15 with an angle 22 which is also referred to as a "kingpin inclination angle". The left steering element 13 is characterized by a steering axis 14, with an angle 23 which is also referred to as a "kingpin inclination angle". The angle 22 & 23 is preferably the same angle, and preferably between 1 to 45 degrees. The left steering axis 14 is preferably intersecting joint 2, but can also have a distance to joint 2. The right steering axis 15 are preferably intersecting joint 3, but can also have a distance to joint 3. A right wheel axis element 25 is connected to the right steering element 12 and is connected to a right wheel 17, which has a wheel center plane 19. The wheel center plane 19 is touching a ground plane 24. A left wheel axis element 26 is connected to the left steering element 13 and is connected to a left wheel 16, which has a wheel center plane 18. The wheel center plane 18 is touching a ground plane 24.

Between right steering axis 15 and right wheel center plane 19, intersecting on ground plane 24 is a distance 20. Preferred embodiment when distance 20 has the value 0, which means that axis 15, wheel center plane 19 and ground plane 24 is intersecting. Between left steering axis 14 and left wheel center plane 18, intersecting on plane 24 is a distance 21. Preferred embodiment when distance 21 has the value 0, which means that axis 14, wheel center plane 18 and ground plane 24 is intersecting. Preferably the distance 21 and 20 is the same value. Preferably the angle 23 and 22 is the same value.

Figure 2:
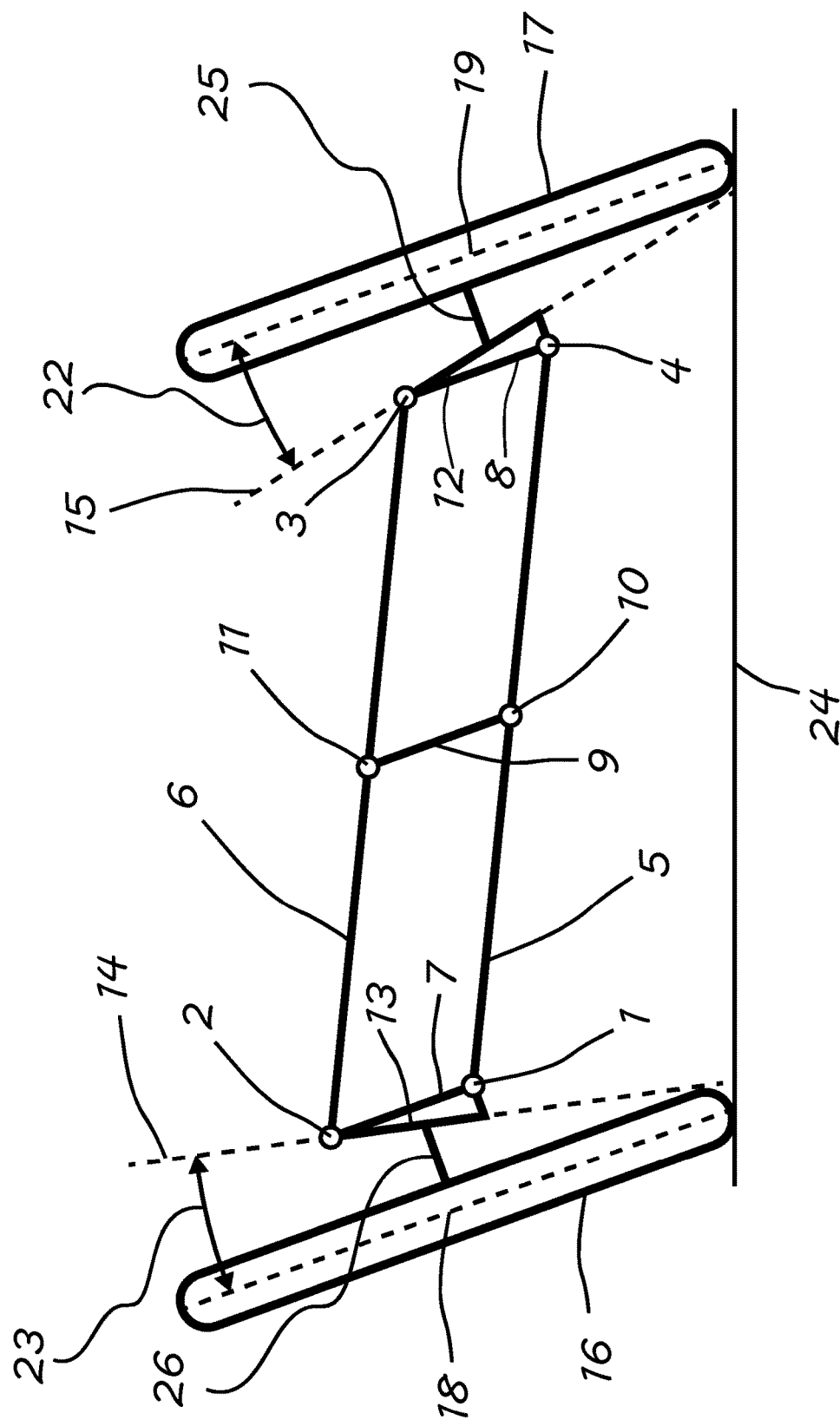
FIG. 2 is a diagrammatic front view of a tilting mechanism in a tilted position.

Referring to FIG. 2, which is a diagrammatic front view of the said tilting mechanism with a tilted position of the present invention.

The structure is comprised of the same linkage mechanism mentioned, and is tilted to a left side position. Due to the parallelogram structure, the body hull 9, left side connection rod 7 and connection rod 8 is parallel at all positions.

Figure 4:
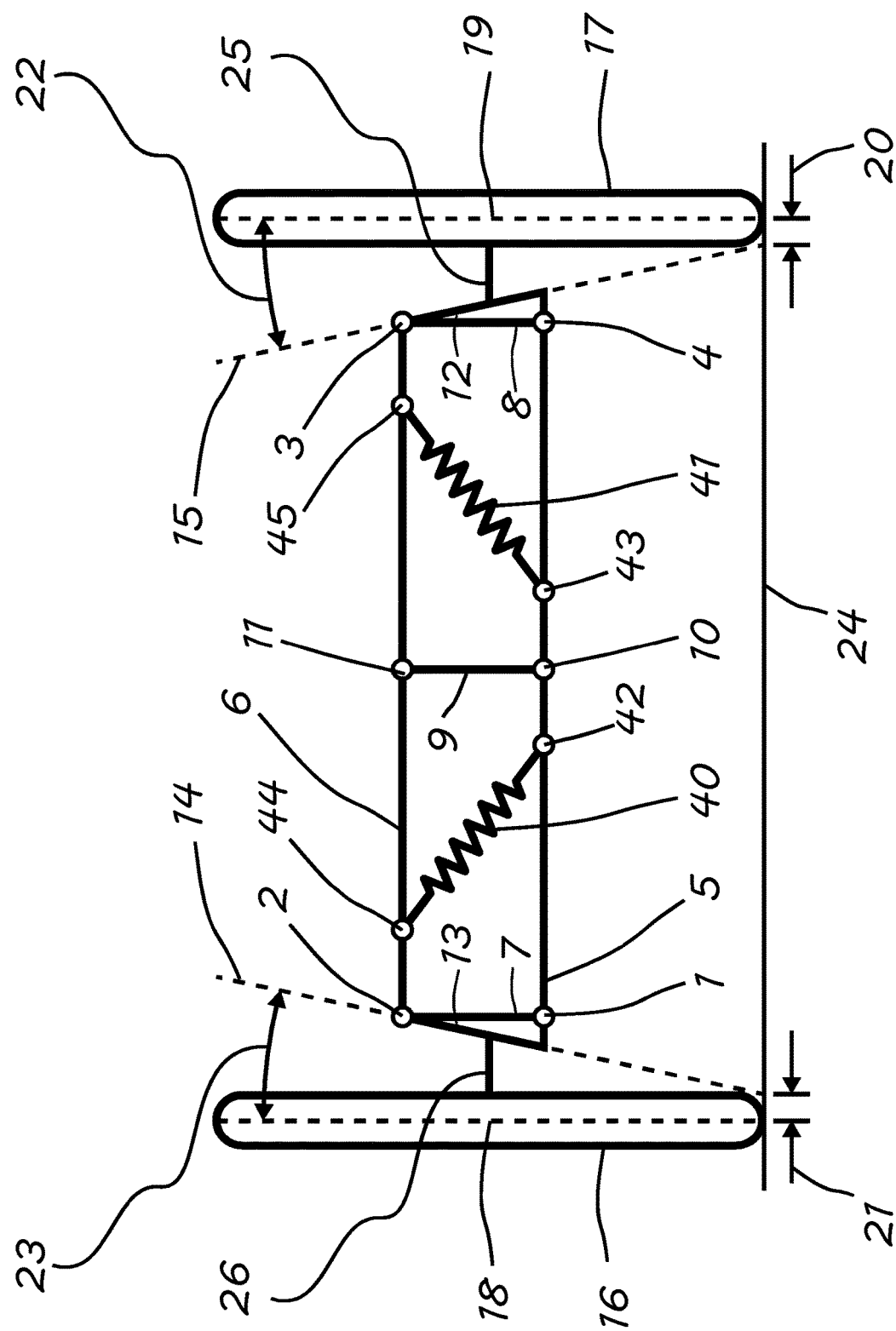
FIG. 4 is a diagrammatic front view of a tilting mechanism with a resilient element in a straight position.
Figure 5:
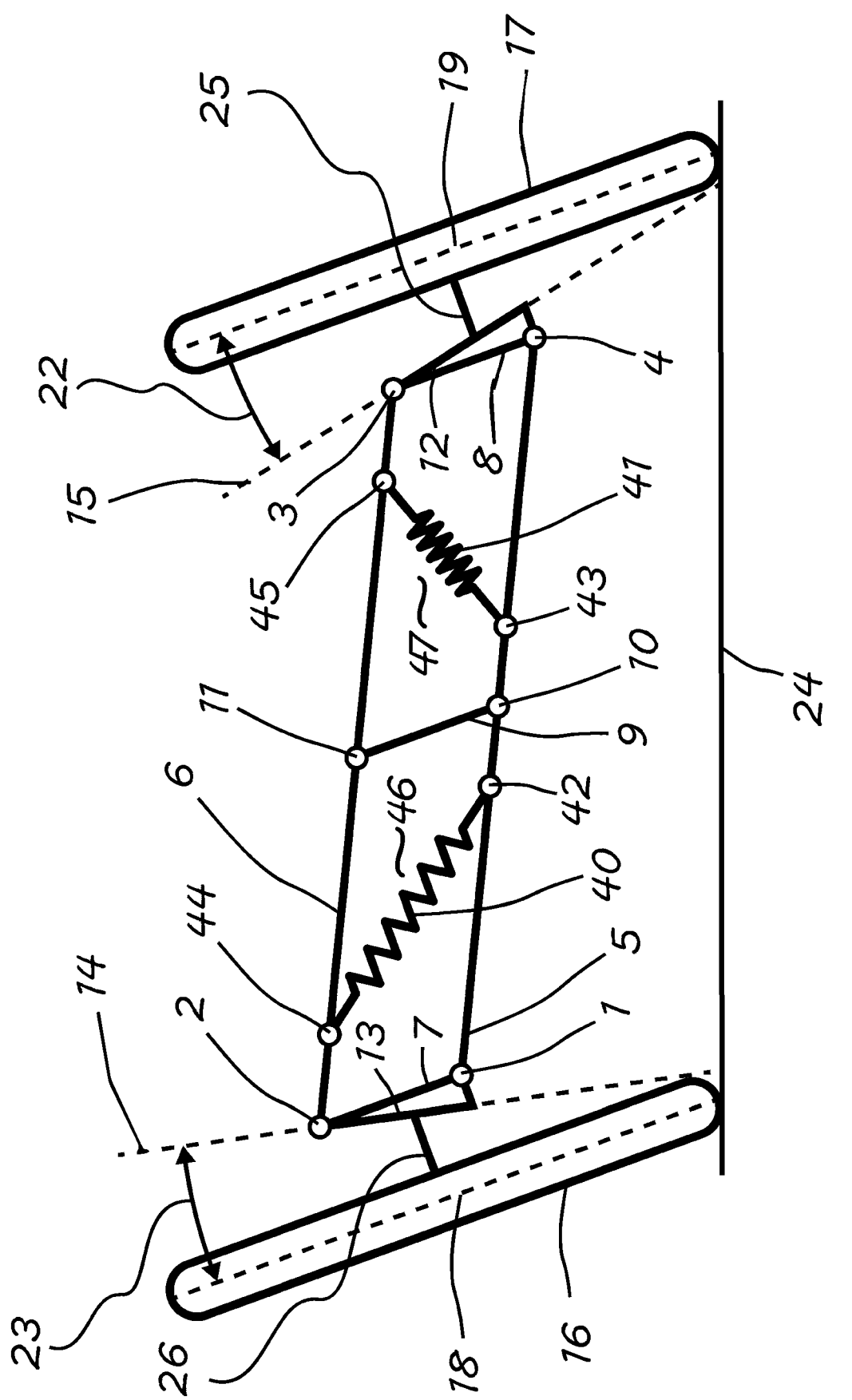
FIG. 5 is a diagrammatic front view of a tilting mechanism with a resilient element in a tilted position.

As shown in FIGS. 4 & 5, the tilting mechanism can also be found with one or more resilient elements to ensure same behavior of a two-wheeled in-line vehicle. The resilient element(s) will help the vehicle easier to reach the vertical position, when the vehicle or the carried load reaches a certain weight. In this way the weight of the vehicle and/or the carried load will feel like non-existing and the leaning movement will feel natural, like a two-wheeled in-line vehicle.

Furthermore as a preferred embodiment the resilient elements can be adjusted with a pretension to ensure the vehicle is held in a vertical apex.

In one embodiment, the resilient elements 40, 41 are connected to top floating rod 6 by connecting joint 44 and connecting joint 45 and to floating rod 5 by connecting joint 42 and connecting joint 43. Alternatively, the resilient elements; 40, 41 is connected to joint 2,3,1,4 or connecting rod 7, 8.

When the vehicle is leaned, or tilted, to the left side, like in FIG. 5, resilient element 40 is stretched and resilient element 41 is compressed. Conversely when the vehicle is tilted to the right where resilient element 41 is stretched and resilient element 40 is compressed.

Figure 6:
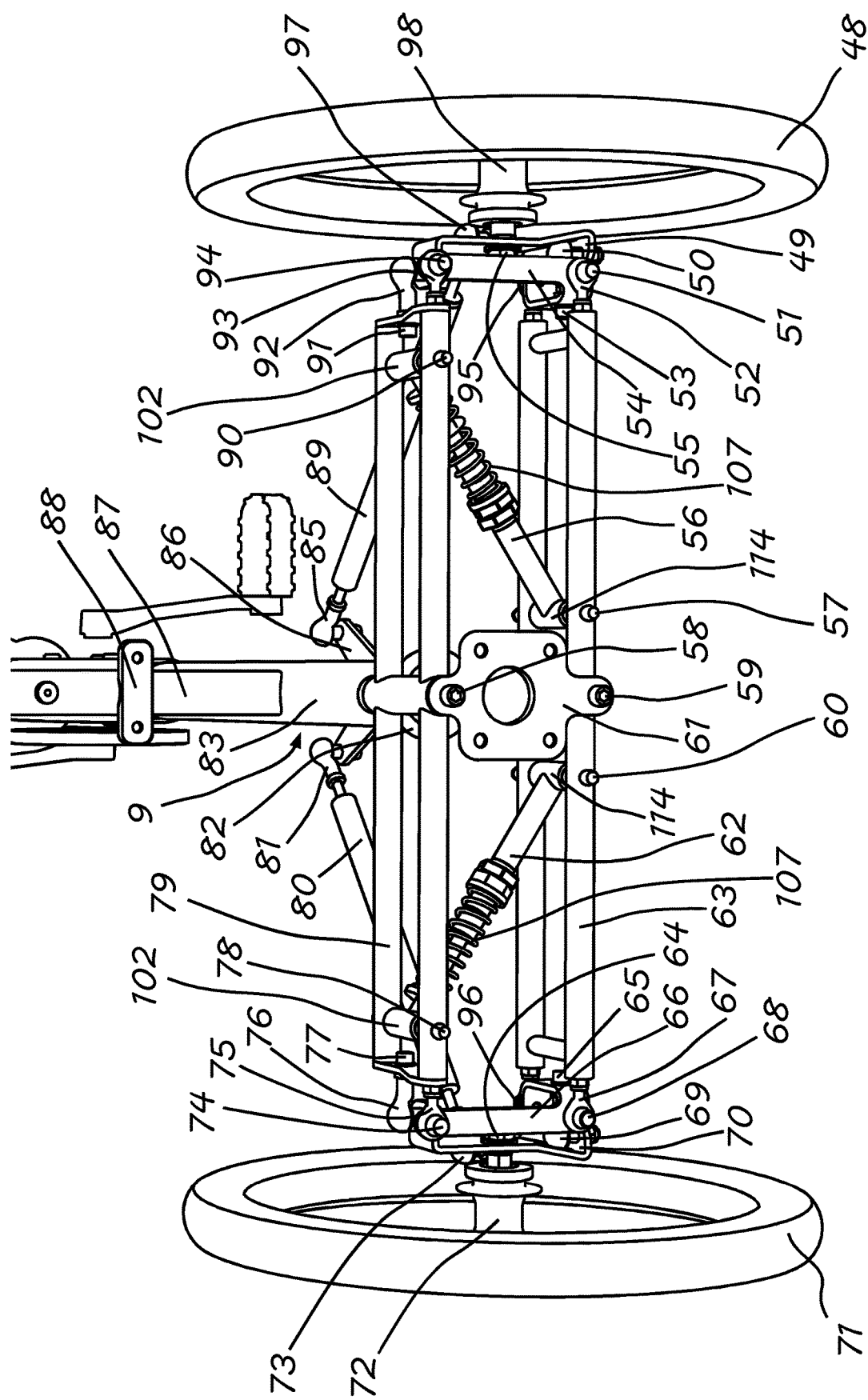
FIG. 6 through 8 is a tilting vehicle, according to an embodiment of the present invention, where.
Figure 7:
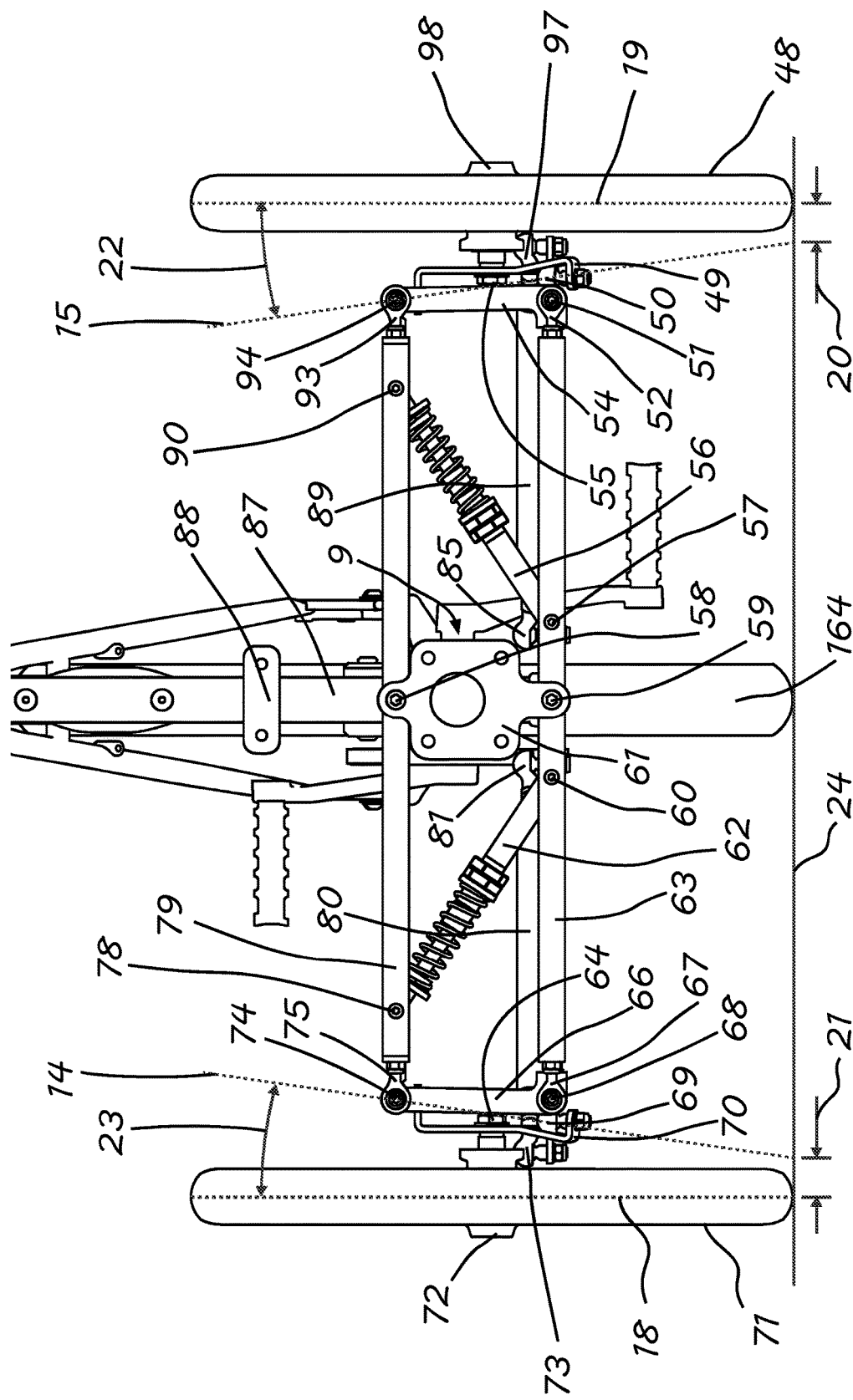
Figure 8:
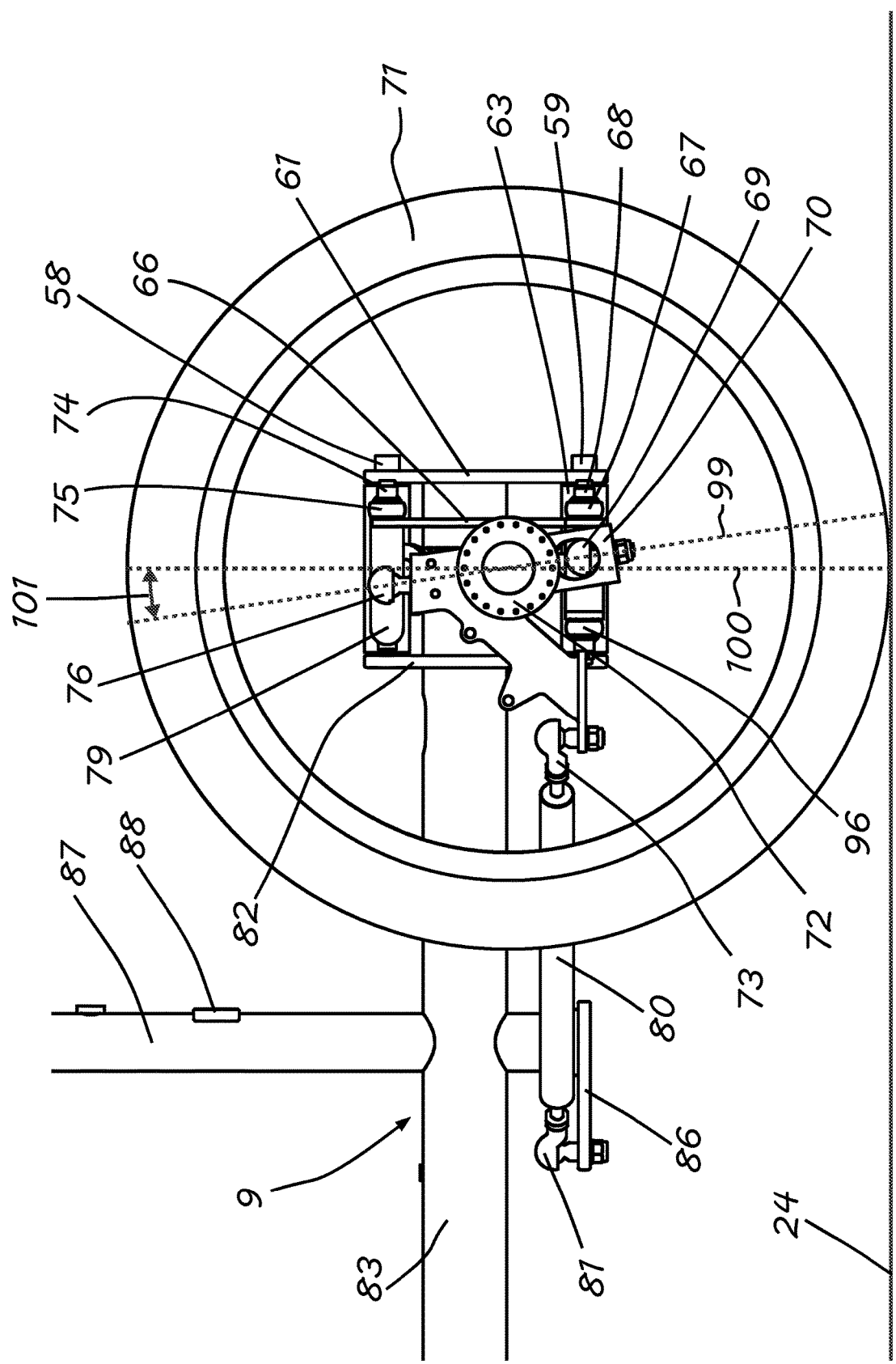

Preferred embodiment, referring to FIGS. 6, 7 & 8, where the hull 9 is a frame comprising the following; front mount plate 61, rear mount plate 82, bottom tube 83, steering tube 87 and mount bracket 88. The preferred embodiment comprises one rear wheel 164 and in the front the structure of the said tilting mechanism. Alternatively embodiment is more wheels in the rear of the vehicle. Another alternative embodiment is the same tilting structure in the rear of the vehicle, either with or without fixed steering axis 14, 15. This would also apply an alternative embodiment comprising fixed steering axis in the front tilting mechanism and steering rear wheels.

In a preferred embodiment, two mounting plates; the rear mount bracket 82 and front mount bracket 61 is attached to a top rigid structure 79 (representing floating bar 6), pivot 2, and to a bottom rigid structure 63 (representing bottom rod 5), connected through a axial connection 58 (representing pivot 11), 59 (representing pivot 10), preferably being bearings with a bolt connection, but alternatively could the connection be with a bushing connection. Characterizing the said rigid connection rods 7 & 8 is preferred embodiment rigid bracket 66 & 54. Each bracket 66 & 54 is representing the rigid connection rods 7 & 8. The top rigid structure 79 is connected to the left bracket 66 by pivot joint 75, with a bolt connection 74 (representing pivot 2), connecting to the left rigid bracket 66 and is connected to right side bracket 54 by pivot joint 93 (representing pivot 3) with a bolt connection 94 to the right rigid bracket 54. The bottom rigid structure 63 is connected to the left bracket 66 by pivot joint 67 & 96 with a preferred bolt connection 68 connecting to the left ridged bracket 66 and is connected to right side bracket 54 by pivot joint 52 & 95 with a preferred bolt connection 51 to the right rigid bracket 54. Steering axis 14 is comprised by the center of pivot joint 76 and pivot joint 69. Steering axis 15 is comprised by the center of pivot joint 92 and pivot joint 50. Pivot joint 76 is connected by preferred bolt connection 77 to top ridged structure 79. On FIG. 7 axis 74, 2 is in the center of pivot joint 76 and axis 94, 3 is in the center of pivot joint 92. Pivot joint 50 is connected to bracket 54 and pivot joint 69 is connected to bracket 66. Left side steering element 13, 70 is connected to pivot joint 76 & 69. Right side steering element 12, 49 is connected to pivot joint 92 & 50. On right side steering element 49, a hub 98 is connected by preferred a connection 55. The hub 98 is in the center of a wheel 48. On left side steering element 70, a hub 72 is connected by preferred a connection 64. The hub 72 is in the center of a wheel 71. Controlling the steering wheels 71 & 48 a steering distributer 86 is connected to the steering elements 70, 49 by joint 73, 97, which again is connected to steering rod 89, 80 which again is connected to pivot joint 81, 85 and then connected to distributer 86. Controlling the wheels 71, 48, the steering distributer 86 is rotated to control the wheels direction.

Figure 3:
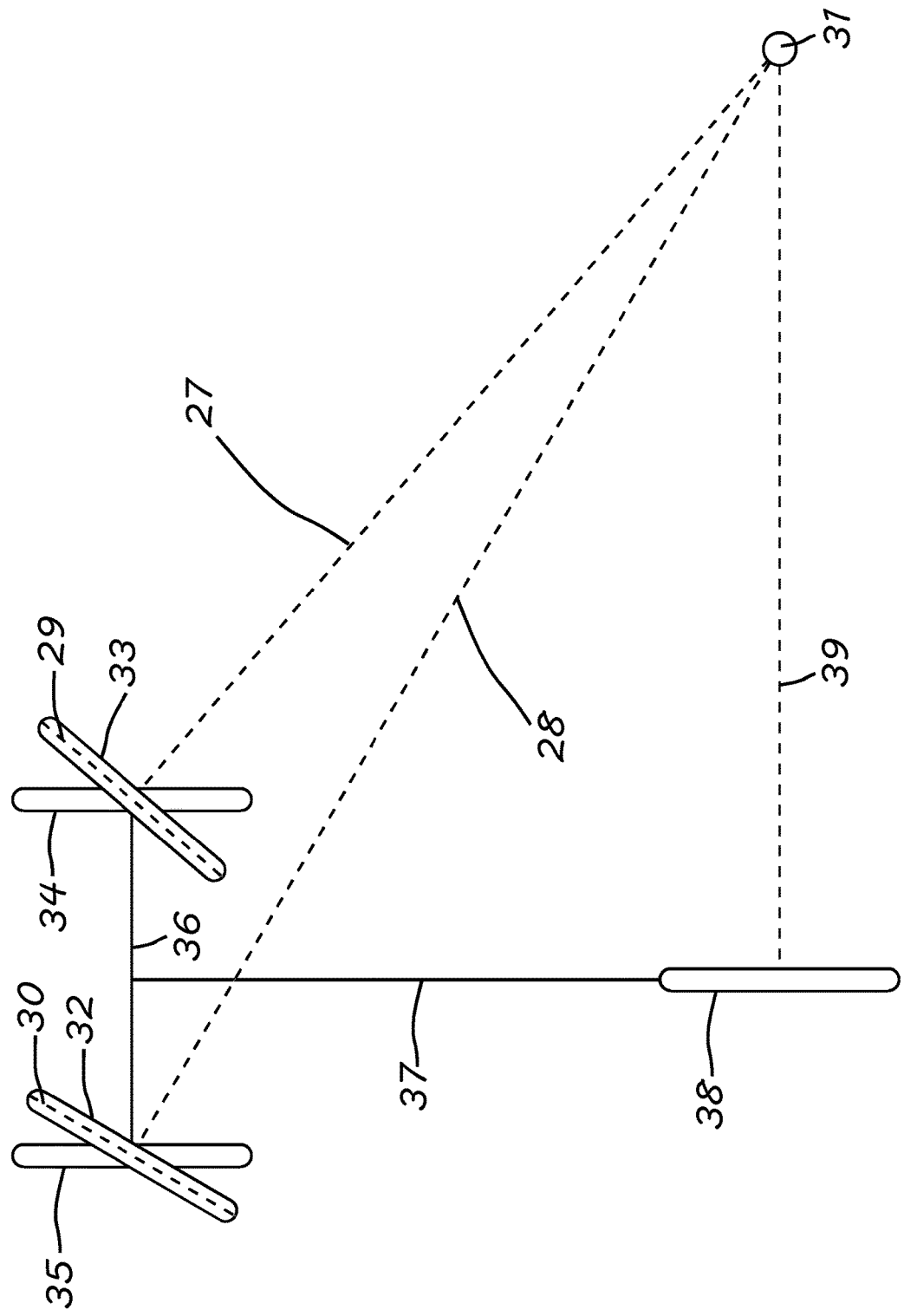
FIG. 3 is a diagrammatic top view of a three wheeled vehicle where wheel center axes meet in a point.

As shown in FIG. 3 the said tilting mechanism and steering mechanism produces an effect on wheel 35 and 34 during turns that is similar to Ackermann Steering Compensation FIG. 3, both in vertical position and in leaned position. As the vehicle is leaned and/or steered, wheel 35 and 34 will take position 32 and 33. From the center planes 30, 29 of the wheels two lines 28 and 27 preferably intercept at rear wheel axis 39 at intersecting point 31. A vehicle hull 37, which is connected to the rear wheel 38, is connecting to tilting mechanism 36.

Referring to FIG. 8 preferred embodiment is characterized by an angle 101, also called Castor Angle. The castor angle helps the vehicle to return into straight ahead position, creates a directional control of the vehicle and is more capable of drive non-effected by a sloped road surface. The castor angle is comprised by line 99 and is intersecting center point of the wheel hub 72, intersecting pivot point of pivot joints 76 and 69. In the preferred embodiment the castor angle 101 is positive, but can in an alternative embodiment also negative. Furthermore the caster angle can also tend the number zero, which is called a true vertical plumb line 100. The angle 99 is in relation to line 100. The preferred value for angle 101 is 1 to 45 degrees in both rotational directions.

Figure 9:
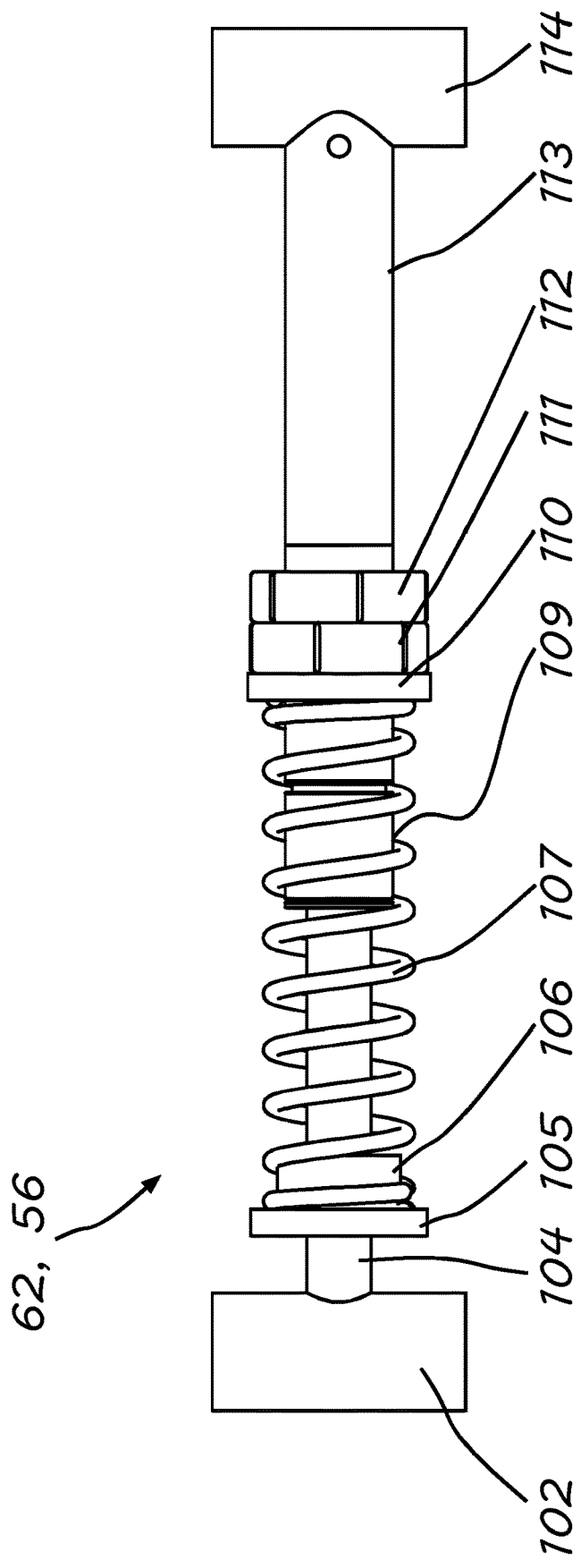
FIG. 9 is a top view of an embodiment of a resilient element in a neutral position.
Figure 10:
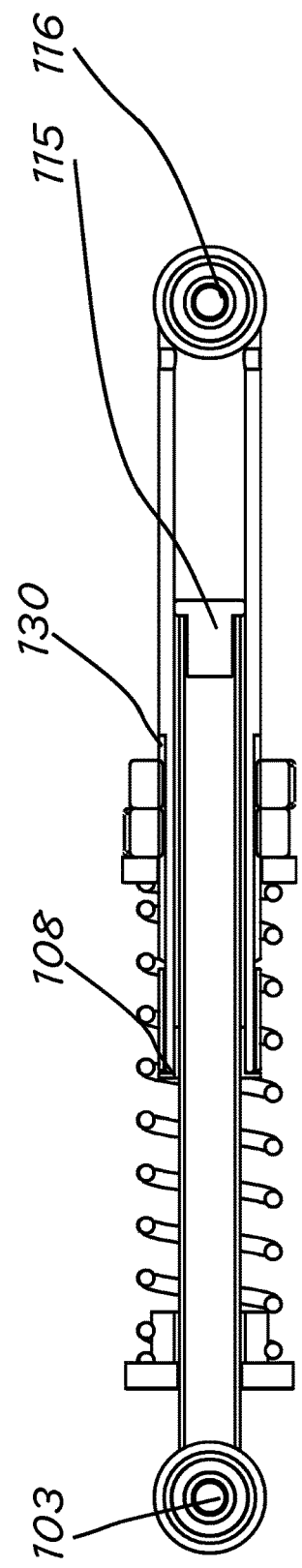
FIG. 10 is a section view of an embodiment of a resilient element in a neutral position.
Figure 11:
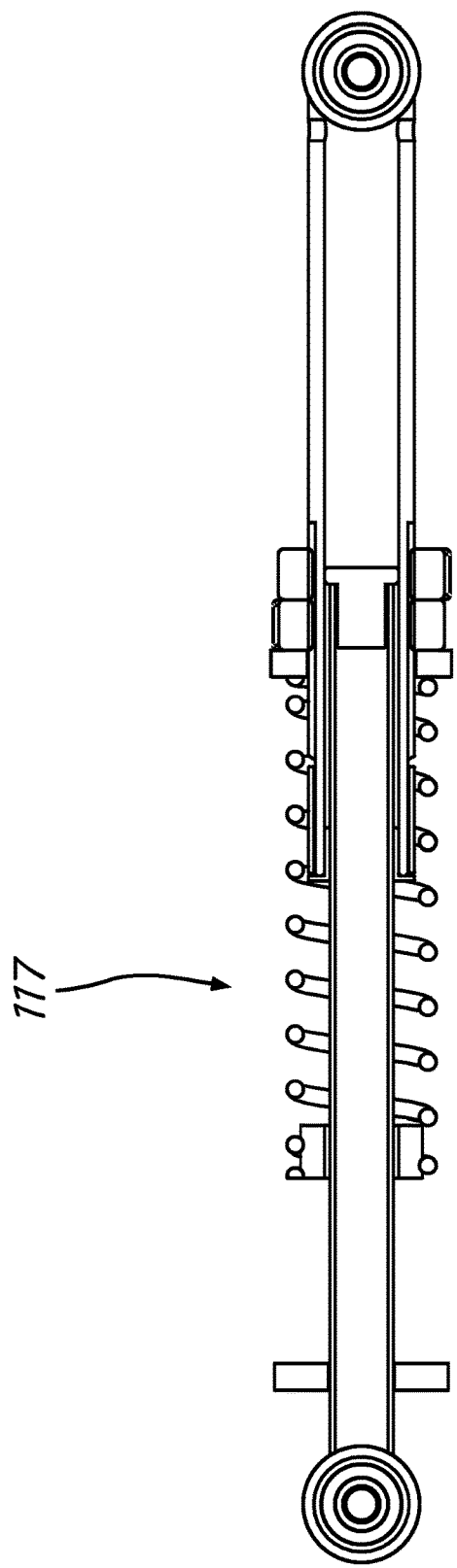
FIG. 11 is section view of an embodiment of a resilient element in an extended position.
Figure 12:
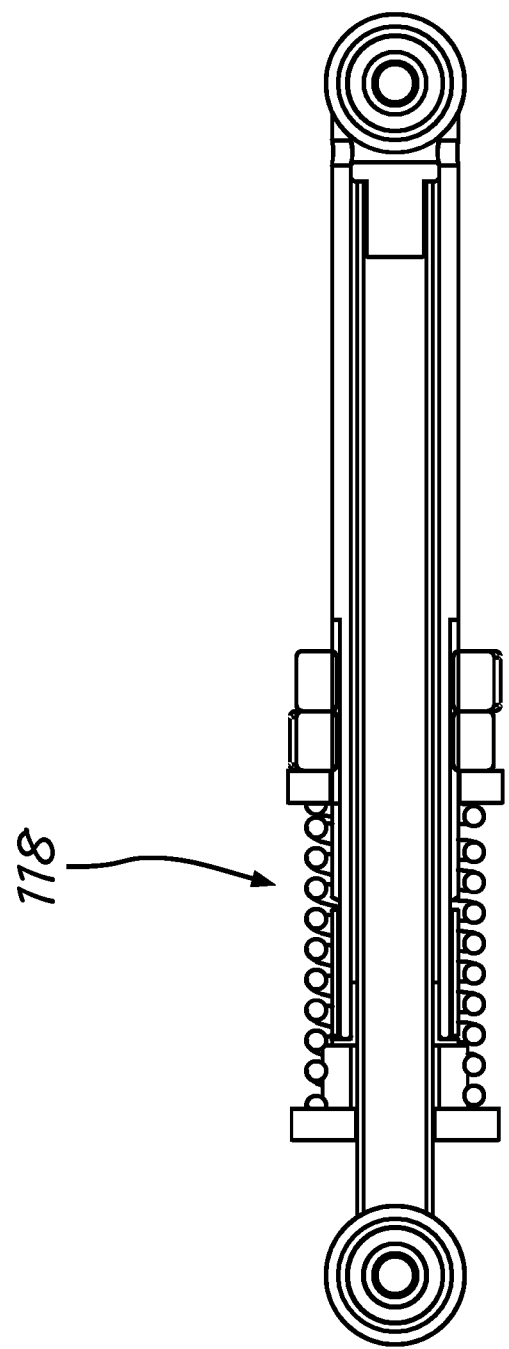
FIG. 12 is section view of an embodiment of a resilient element in a compressed position.
Figure 13:
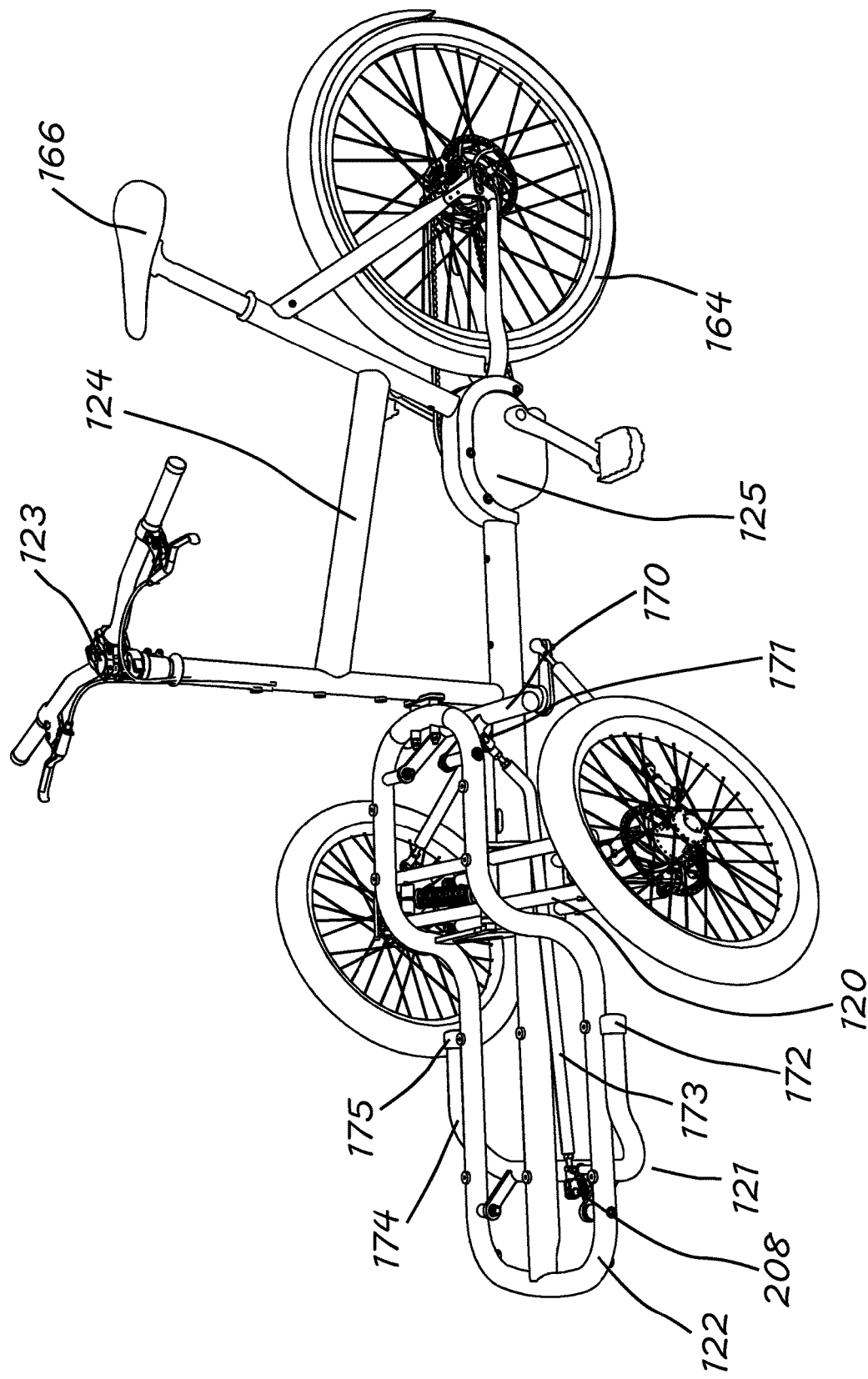
FIG. 13 is a perspective view of a preferred embodiment of a tilting vehicle, tilted and wheels turned.
Figure 14:
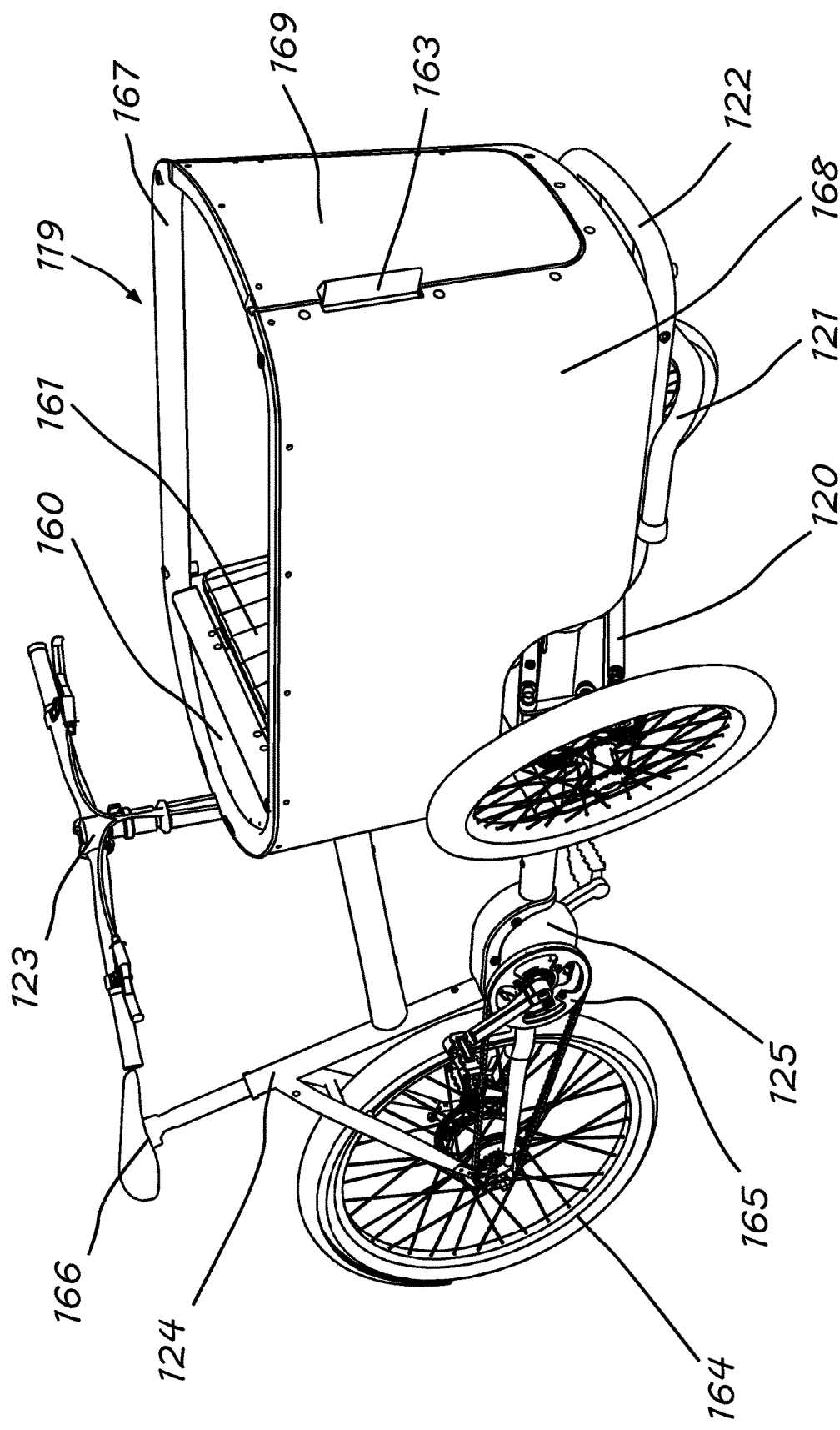
FIG. 14 through 17 is a preferred embodiment of a tilting vehicle, tilted and wheels turned and a cargo embodiment, where.

The preferred embodiment in FIG. 6 through 8 is comprised with two resilient members, hereafter called resilient elements 62, 56. The resilient elements 62, 56 are preferably two double acting spring elements seen in FIG. 9, which is a top view and at FIG. 10 a section FIG. 10 view of the said spring element. The double acting comprises two actions, one with a compression of the spring showed in FIG. 12, 118 and two where the springs stays in unaffected position, hold into position by position hold 106. The spring element is comprised by an axel housing 102, preferably comprising bearing(s) or alternatively bushing(s). Rigid connected to the axel housing 102 is rod 104, which is rigid, connected to spring stop 105. At the end of rod 104 is a sliding element 115 to reduce friction in the spring element. The resilient element is a spring 107 comprised with a position hold 106 to keep the spring in the correct position when the spring element is at stretched position FIG. 11, 117. Further more the position hold 106 is also functioning as a spring stop when the spring element is in a complete compressed position FIG. 12, 118. An axel housing 114 is rigid connected to a rod 113, which is characterized by a threaded area 130 to ensure adjustment of the spring 107.

To reduce friction between rod 104 in a movement, spring element bushing 108 is positioned in the end of rod 113. To ensure a noiseless and non-wear when moved a bushing 109 is added. A spring stop 110 characterized, as a disc element is hold by two union nuts 111, 112 with treads. These union nuts adjust the tension and position of the spring 107.

In an extended position the spring element 117 is characterized by the spring 107 and spring position hold 106 has a distance to spring stop 105. The spring position hold is then leaning at rod 104 to keep the desired position. In a compressed position FIG. 12, 118 the spring 107 is compressed and the spring position hold 106 is acting as a soft stop. Referring to FIG. 7 the two resilient elements 62, 56 are adjusted with a tension to ensure a vertical position. This is applied by adjusting nut 110 and 111 to set a tension force on the spring 107. A preferred embodiment of FIG. 6 through 8 is comprised with brake applications connected, preferably to steering elements 70, 49 and preferably to wheel hub 98, 72.

Figure 18:
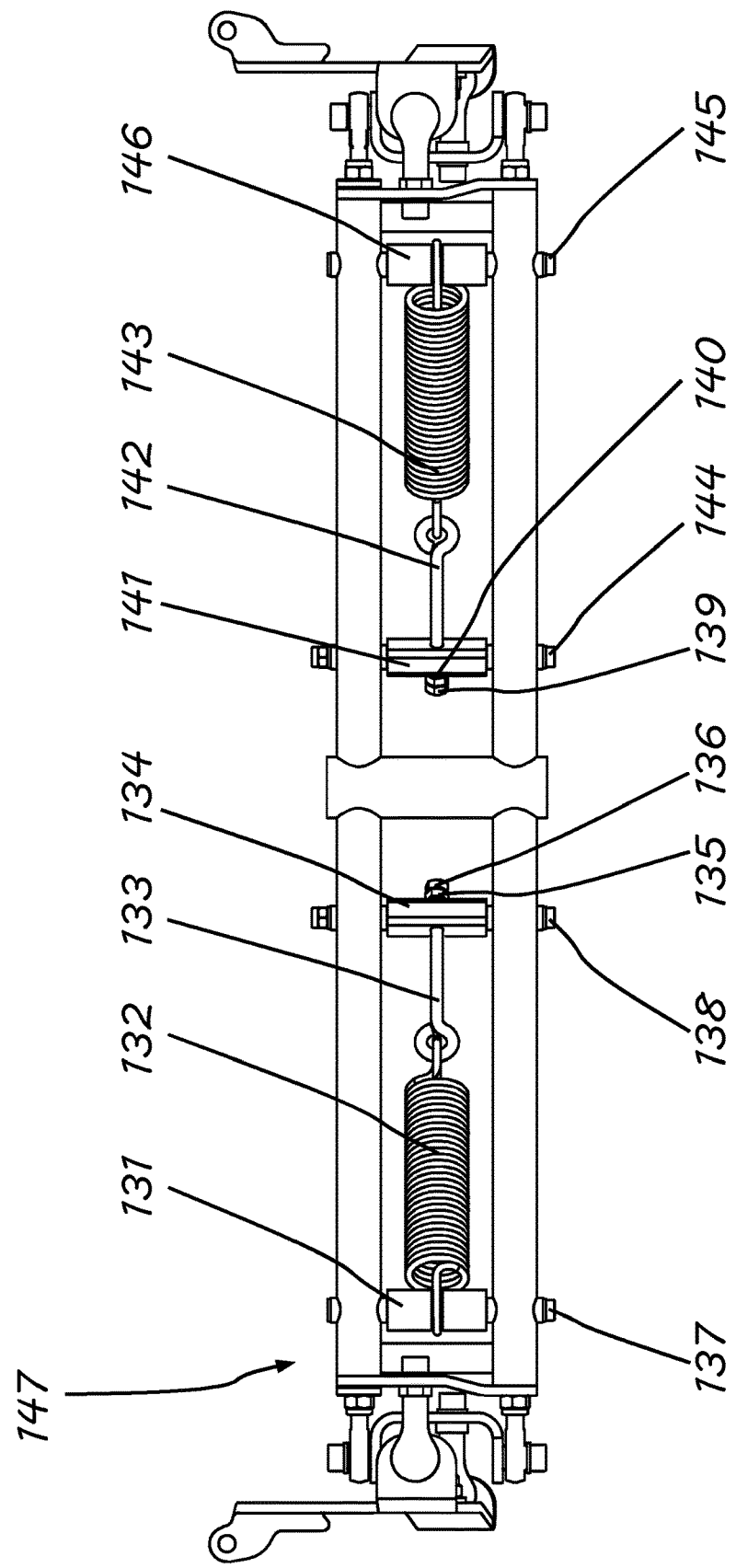
FIG. 18 through 20 is an alternative embodiment of the resilient element in the tilting mechanism, where.
Figure 19:
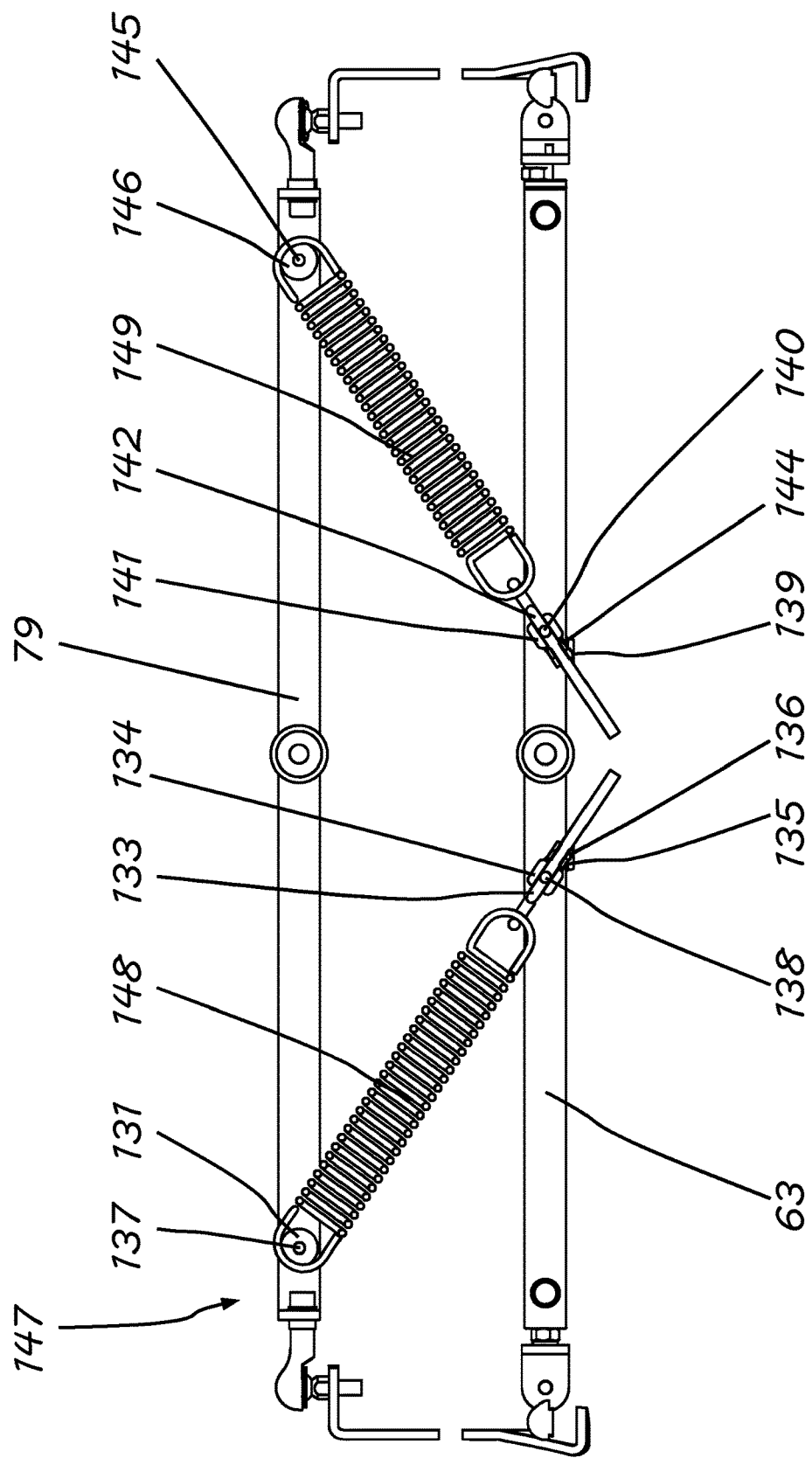
Figure 20:
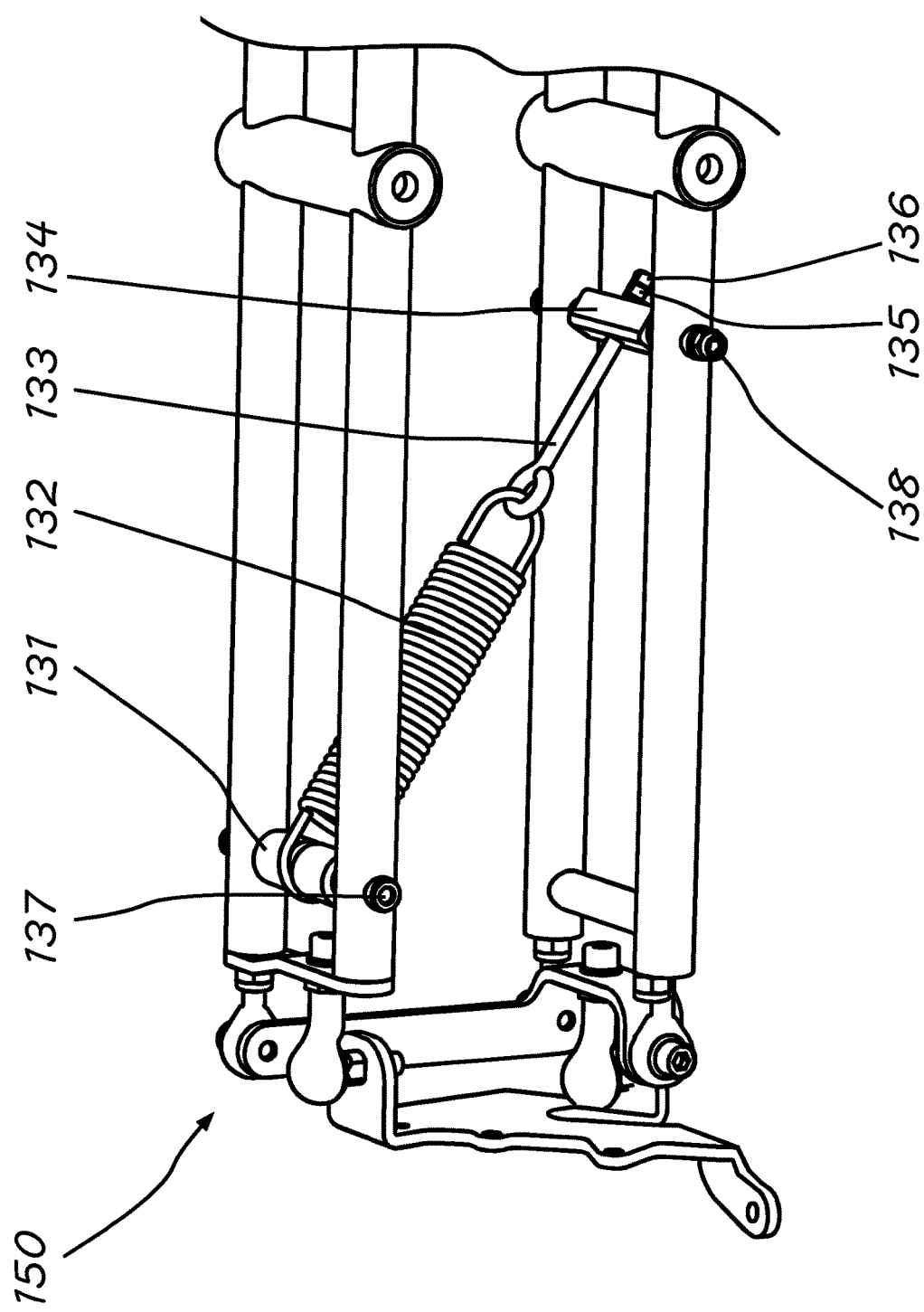
Figure 21:
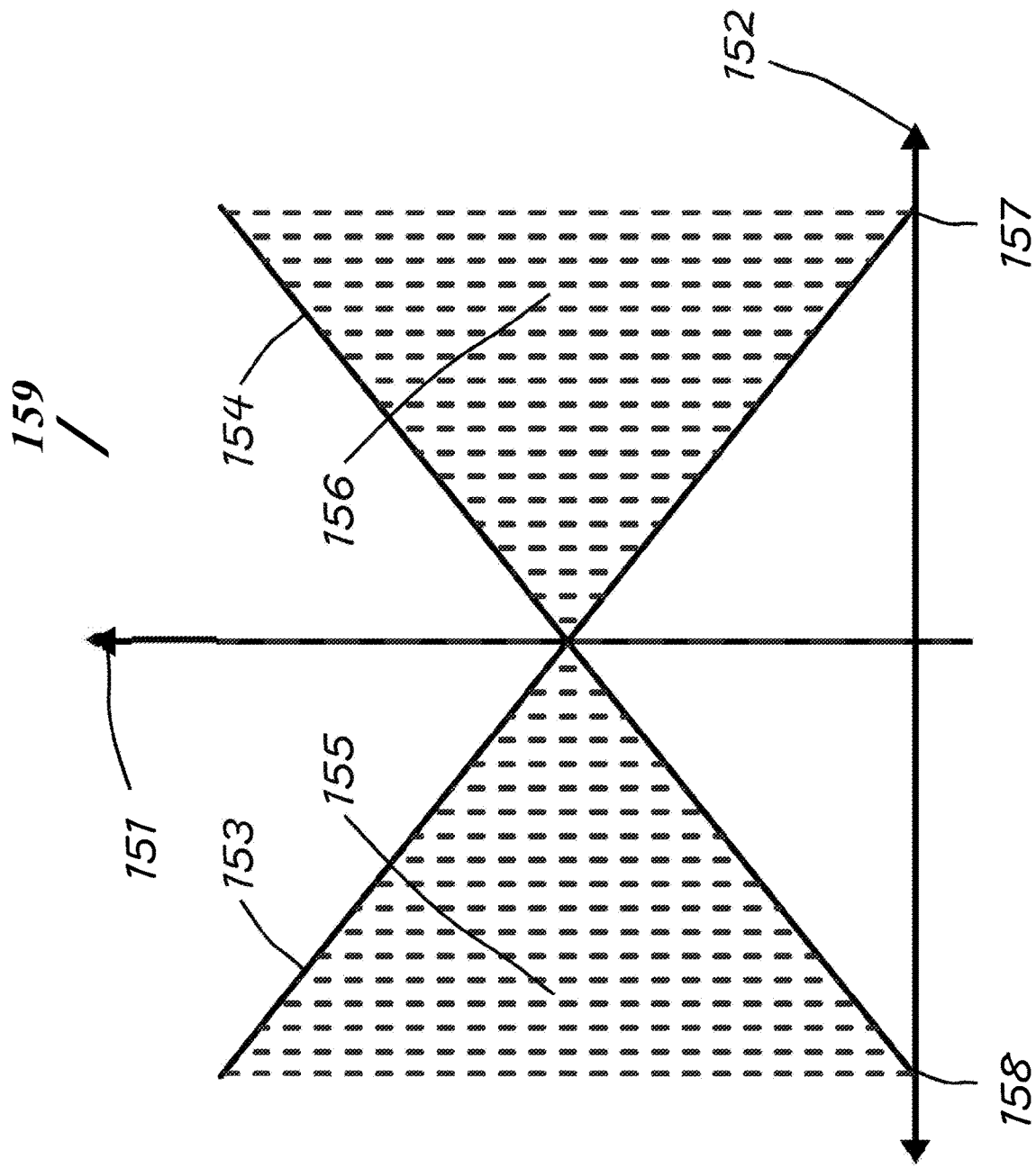
FIG. 21 is a diagram of the forces in the resilient element system in the alternative embodiment of the resilient elements in the tilting mechanism.

Alternative embodiment for the spring element is seen in FIG. 18, which is a front view of the said tilting mechanism 147, with an alternative spring structure. The spring structure is comprised by fixing elements 131, 146 which preferably is rigid connected to the tilting mechanism 147 with bolt connections 137, 145. Alternatively the fixing element can be rigid integrated in tilting mechanism 147. Resilient elements 132, 143 preferably a pull extension spring is connected to fixing elements 131, 146 and to tension elements 133, 142. The function of the tension elements 133, 142 is to tension out the springs 132, 143. Referring to FIG. 5 the principle of the leaning to the left where spring 47 is in a compressed stage and spring 46 is a stretched stage. The fixing elements 133, 142 tensions the springs enough, following the spring in position 47 still have a minimum tension and in position 46 has a maximum tension. This means in a vertical non tilted position FIG. 4 the extension springs, 132, 143 have a tension to equalize each tension. The individual tension of each spring will be adjusted to achieve the desired position of the neutral, vertical position of the vehicle. When tilting, the connection between fixing elements 131, 146 and extension springs 132, 146 will preferably rotate. The tension elements 133, 142 are going through fixing elements 134, 141 and are tensioned by nuts 135, 136, 139, 140. The fixing elements 134, 141 are connected to tilting mechanism 147 with rotational connections 138, 144. Referring to FIG. 20, which is a cropped perspective view of the left side of the tilting mechanism 150. Extension spring 132 is in a non-tensioned state. Referring to FIG. 19, which is a section view front view where extension spring 148, 149 are tensioned to achieve the desired vertical position. Referring to FIG. 21, which is a diagram of the spring forces linked in the spring element system. The diagram 159 comprises a horizontal x axis 152, which is representing travel distance in the system and a vertical y axis 151, which represents the forces for the resilient elements. Due to the structure of the tilting mechanism 147 the travel distance 152 goes from 0 at Y axis 151 position to maximum travel distance at 157 to the right and at 158 to the left. The forces in the system is defined by the intuitive area if the region 155 and 156, between the curves g(x) 153 and f(x) 154 and between point on x axis 152, 158 and 157.

The said resilient element comprises alternative embodiments like; elastic materials, leaf springs, hydraulic resilient elements, air camper springs and the like.

Referring to FIGS. 13, 14, 15, 16, 17 and 24 where a preferred embodiment of the tilting mechanism comprises a tricycle with a main frame 124, as a hull, a load carrier 122 which can support loads, a steering aggregate 123 to control the steering wheels connected to steering plate 86. The load carrier 122 is connected to the main frame 124 at connecting bracket 61 and at connecting bracket 88. The tilting mechanism 120 is connected to the main frame 124 at connecting bracket 82 and connecting bracket 61. Alternative embodiment for the steering aggregate 123 could also be control levers, circular steering wheel, and the like.

The main frame 124 is comprised with a seating component 166 to hold the operator of the vehicle. A rear wheel 164 is connected to the main frame 124. The vehicle can be found with both an assisting powered motor 125 or as manually powered propulsion. The motor can be driven by electricity, petrol, gas, hydrogen etc. A drive train element 165 is transmitting the momentum from the motor or the pedals to the rear wheel. The preferred embodiment for the drivetrain is chain, belt, prop shaft or mechanical gears. The preferred embodiment of the tilting mechanism is also comprised by a stabilization mechanism 121 to ensure stability when parking or operating the vehicle in stand still operation and ensures the vehicle not to tilt or flip over. The stabilization mechanism is activated by the operator, when operator leaving the seating element 166 and standing on the ground 24, preferably with a foot, but alternatively with other means, from behind the steering tube 87 touching activator element 170 and pulling back the vehicle, preferably by pulling the steering element aggregate 123. This can be done from the left side standing behind the steering tube or from the right side. Activator element 170 is pivotally connected to load carrier 122 and pivotally connected to activator rod 173. The activator rod 173 is then pivotally connected to stabilization element 174 which is pivotally connected to load carrier 122. As a preferred embodiment on the said stabilization element 174 are two friction elements, 172, 175 which touch the ground 24. Alternative embodiment the stabilization element touches ground 24 seen in FIG. 24 as activated in position. The height of the stabilization element 174 enables the vehicle to balance on three points; real wheel 164 touching ground 24 and the two points 175, 172 touching ground 24. The force from the weight of the vehicle on the front wheels 71 & 48 on ground 24 will be reduced, either by a little or the whole load, or just so the vehicle does not tilt; touching the two points 175, 172 when starting to tilt. To deactivate the stabilization mechanism 121 the operator pushes or drives forward the vehicle where the stabilization mechanism will return to driving position. In the driving position the stabilization mechanism is hold into position by preferably a pull spring 208. Alternative embodiment could also be a mechanical bracket, lock, magnets or other means on either of the stabilization mechanism moving parts; activator element 170, activator rod 173, stabilization mechanism 121.

Furthermore the preferred embodiment comprises a compartment element 119, such as a box, closed or open, which preferred use is to contain cargo, children, dogs, persons, or other types of goods. The box element is preferably comprised by a profile 167 to ensure stiffness to the compartment element 168. Alternative embodiment of this could be found in the shape of box 168. The box element 119 also comprises a door in the front 169 with a locking mechanism 163 to control the door opening. Inside the box element 119 is preferably comprised with seating element 161 with preferably back support and a bottom support. Behind the back support is found a storage room under the lid 160. The lid 160 is connected to the back support by a hinge connection.

Figure 15:
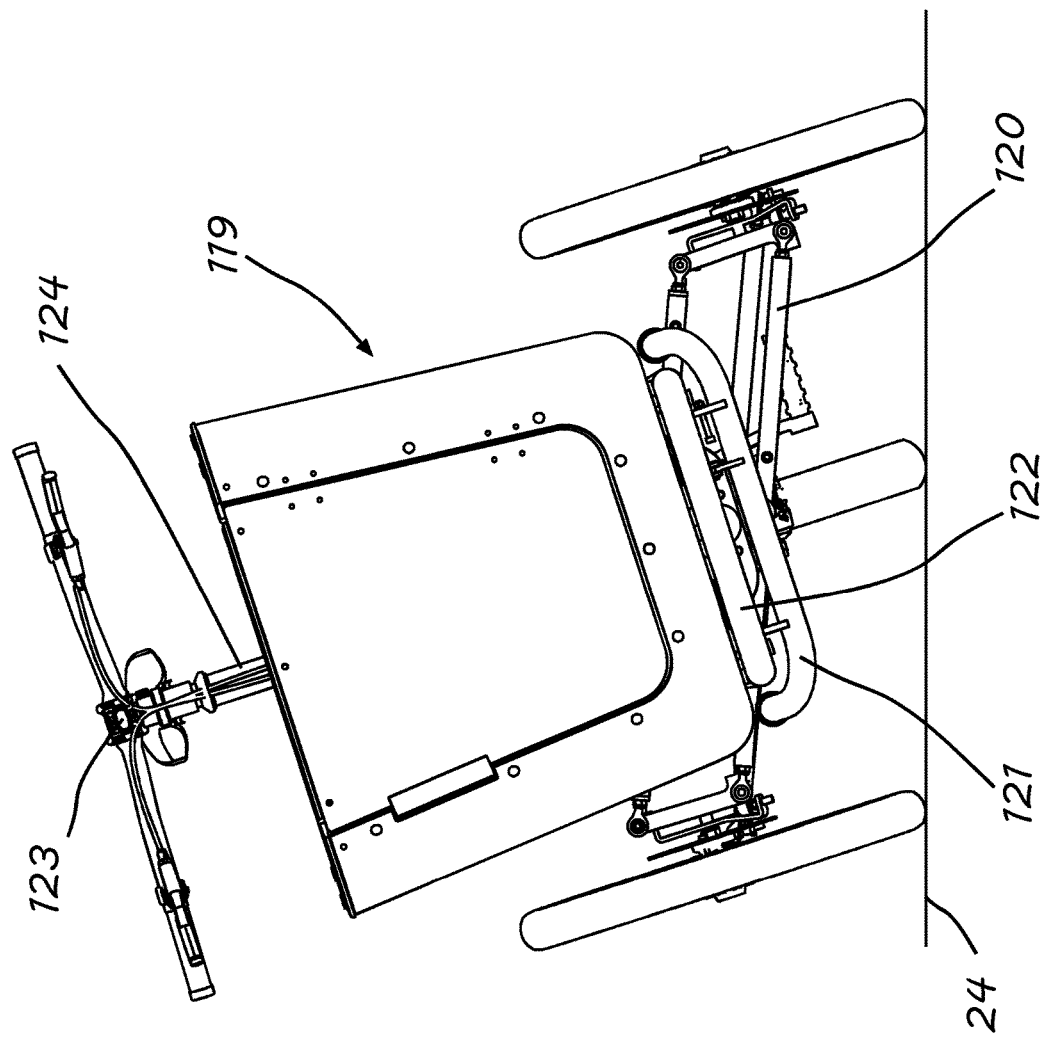

Referring to FIG. 15, the preferred embodiment is tilted in a maximal position, preferred angle is −45 to 45 degrees from a vertical position. The steering wheels are not turned. The angle in the illustration is tilted 18 degrees.

Figure 16:
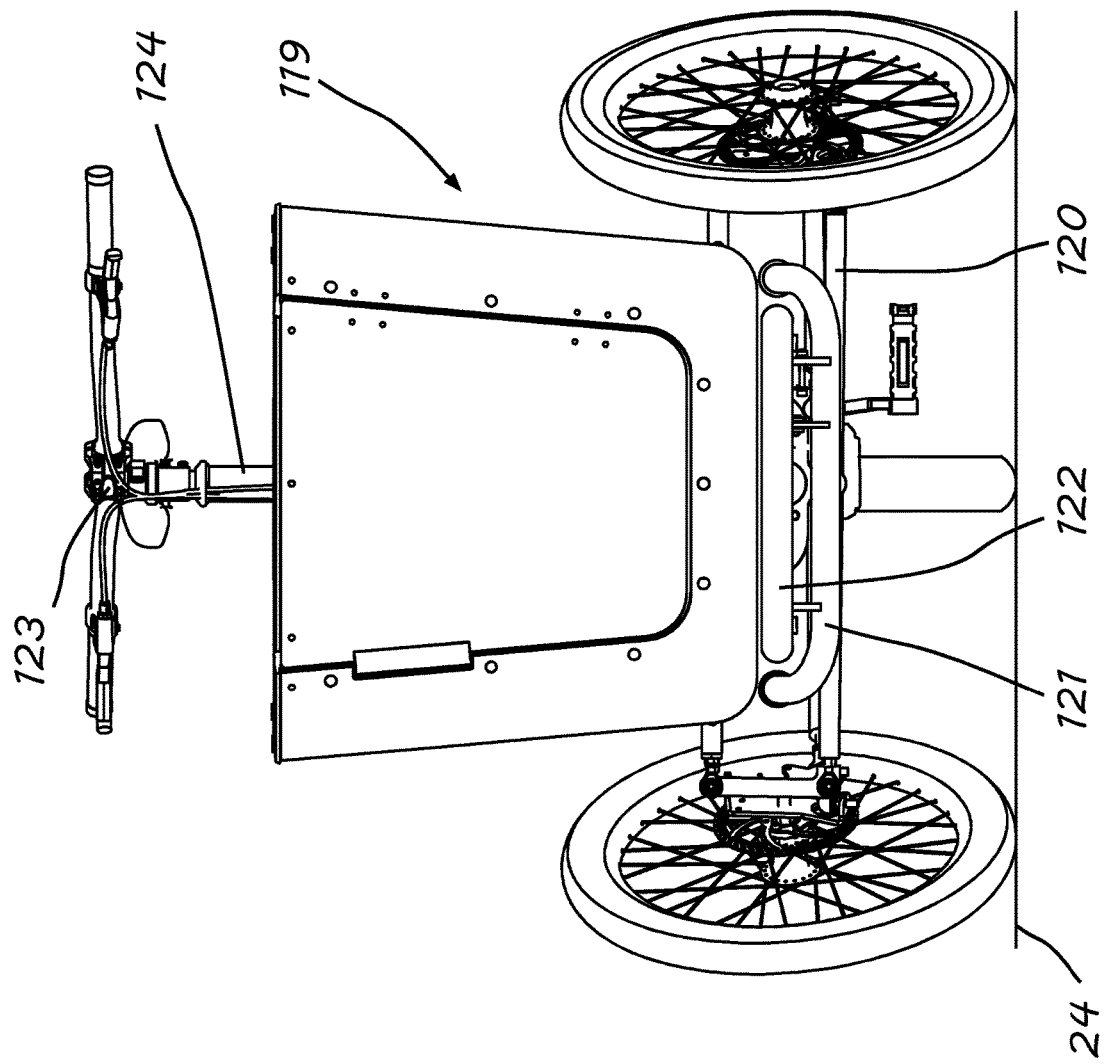

Referring to FIG. 16, the preferred embodiment have steered wheels in a maximal position, preferred angle is −50 to 50 degrees from a straight out position. The tilting mechanism is not tilted and is in a vertical position. The steering angle in the illustration is 30 degrees.

Figure 17:
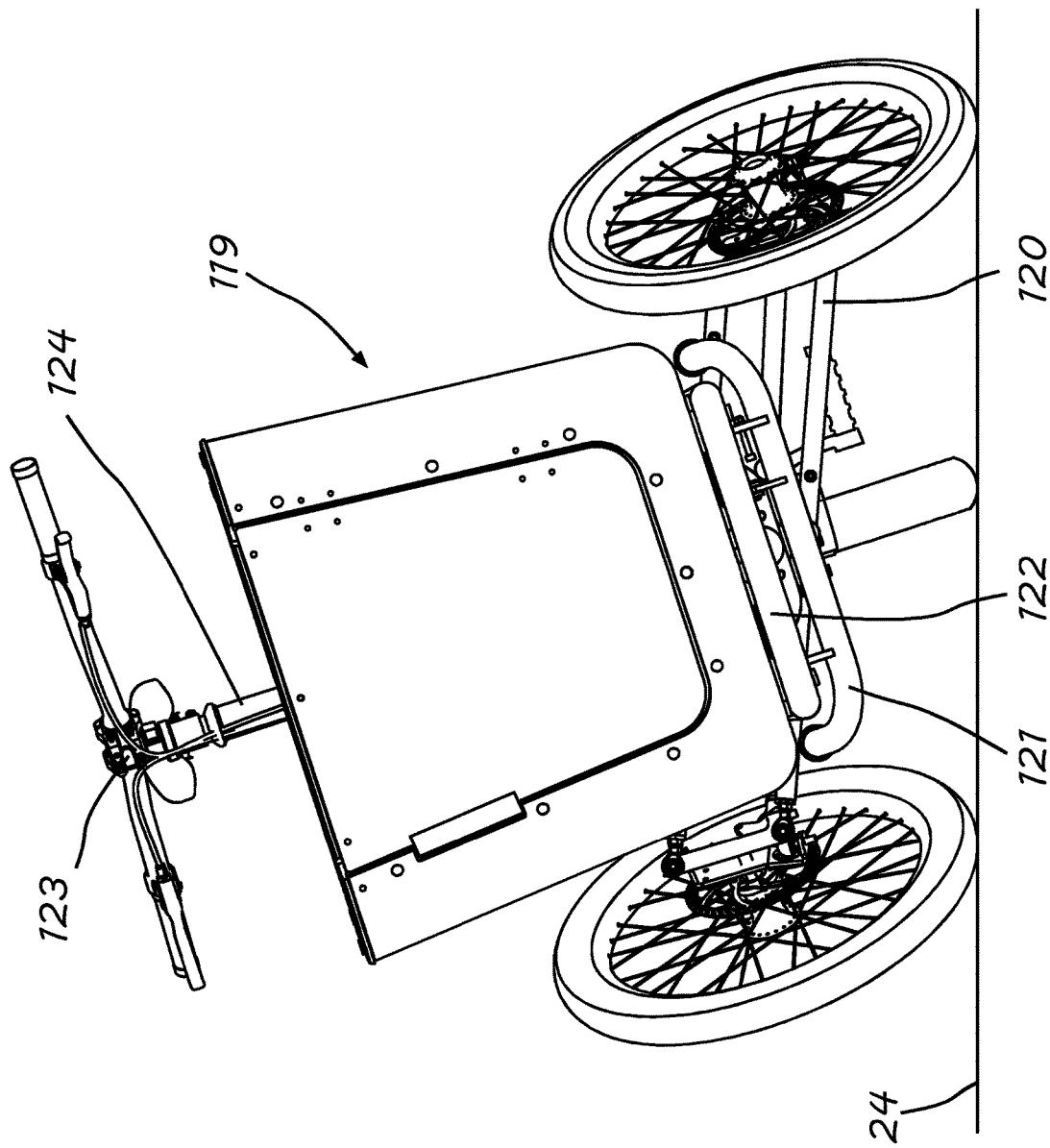

Referring to FIG. 17, the preferred embodiment have steered wheels in a maximal position, preferred angle is −50 to 50 degrees from a straight out position and is tilted in a maximal position, preferred angle is −45 to 45 degrees from a vertical position. The tilt angle in the illustration is tilted 18 degrees.

The steering angle in the illustration is 30 degrees.

Figure 22:
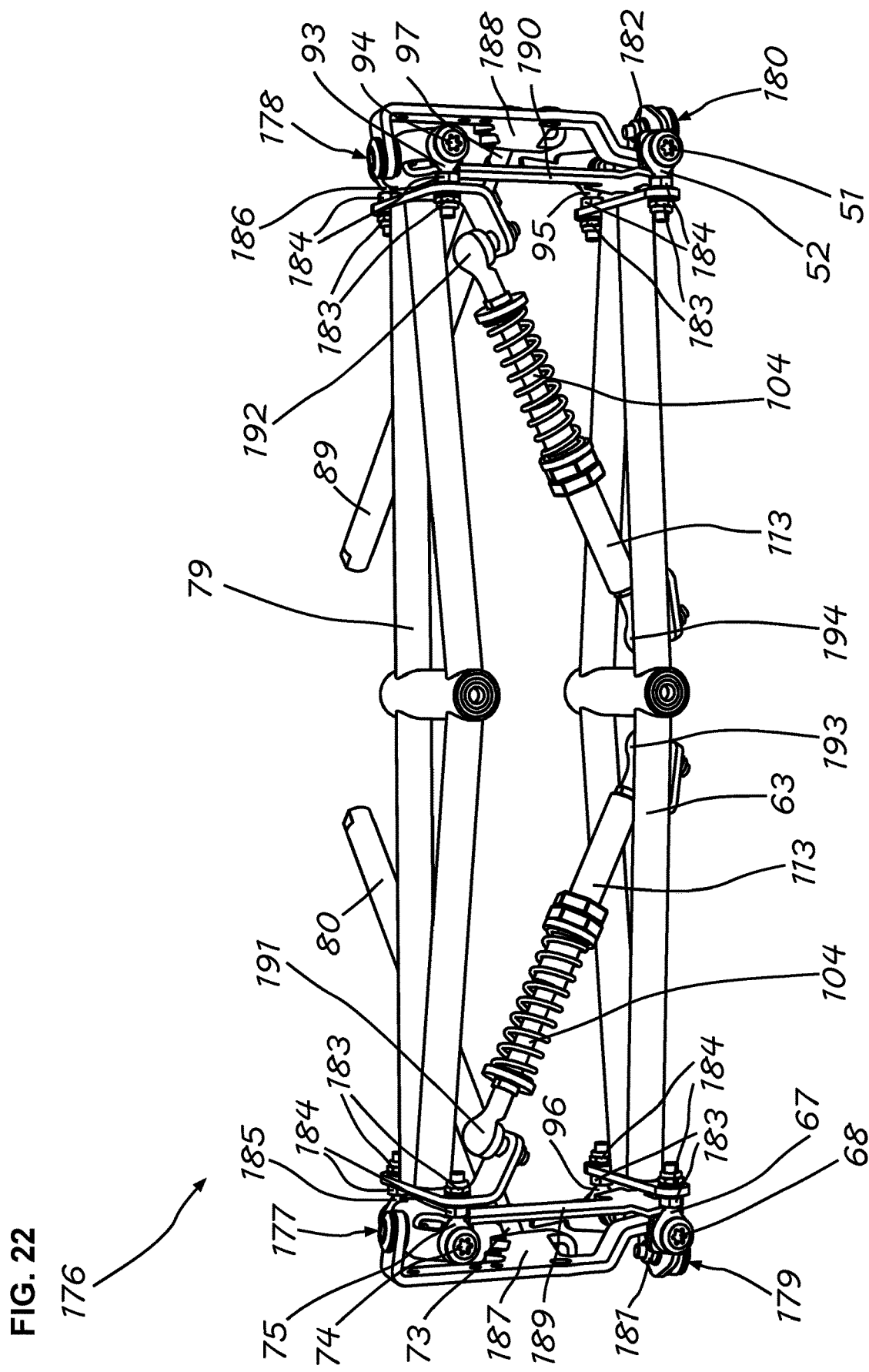
FIG. 22 is a perspective front view of an alternative embodiment, where.
Figure 23:
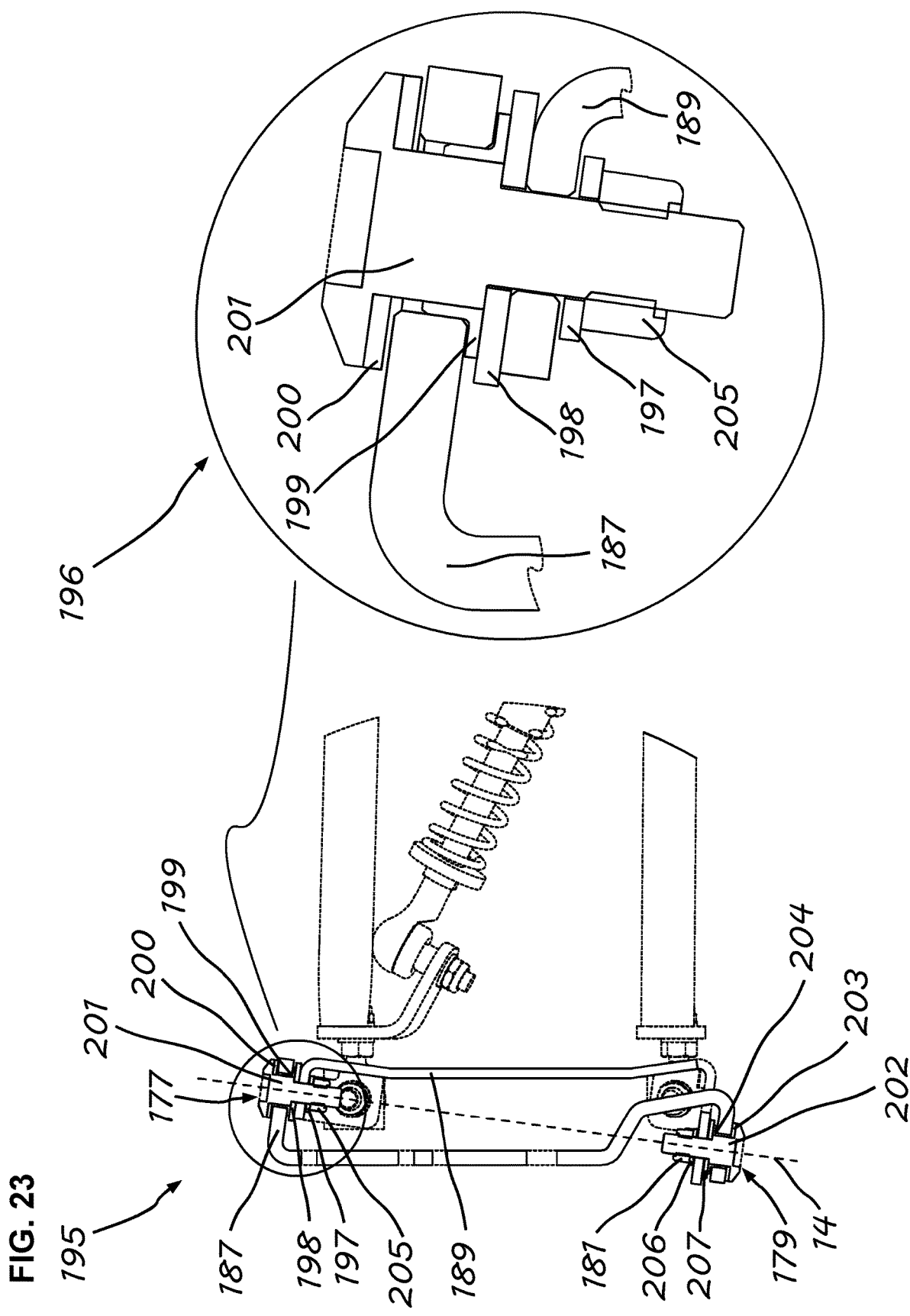
FIG. 23 is a part section view and detailed view of the part section view of the alternative embodiment of FIG. 22.
Figure 24:
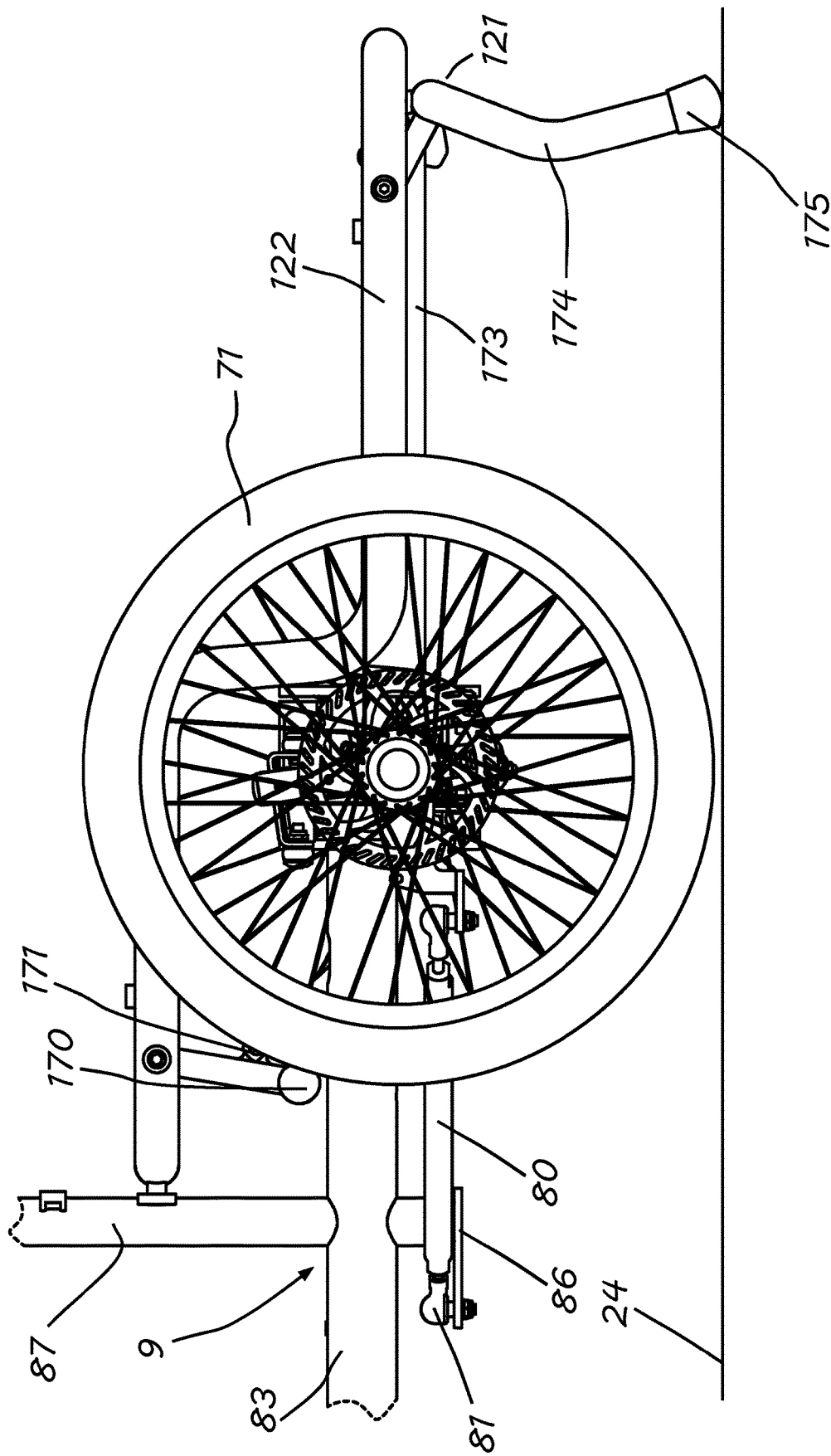
FIG. 24 is a cropped side view of a preferred embodiment of a multiple-wheeled vehicle having a tilting mechanism, where the stabilization mechanism is activated.

Alternative embodiment 176 for connection method of steering element 13, 12, connecting rod 7, 8 and pivot 1,2,3,4 is seen in FIG. 22, which is a perspective view of the said tilting mechanism and in FIG. 23, a section view of the right side 195 and a detailed view 196. The alternative embodiment comprises the method for enabling the rotation around the steering axis 14, 15 and the connection to rigid connecting rods 7, 8, preferably with bearing constructions 199, 204 in joint connections 177, 179, 178, and 180 with steering elements 12, 13. Alternatively the bearings can be closed or open bearings and of different types, both standard bicycle bearings, closed sealed types, open bearings and the like. The bearing materials are preferably polymer but can alternatively be in other materials like for example metals. The alternative embodiment comprises the bottom rigid structure 63 connecting to pivot 1 & 4 by pivot joints 52, 95, 67, 96. The said pivot joints are pivotally connected to rigid brackets 189, 190 and connected via a preferred bolt connection, 51 and 68. The top rigid structure 79 is connected to pivot 2 & 3 by pivot joints 75, 185, 93, 186. The said pivot joints are pivotally connected to rigid brackets 189, 190 and connected via preferred bolt connections, 94 and 74. Each of the said pivot joints 67, 96, 52, 95, 93, 186, 75, 185 are connected to the top- and bottom ridged structures 63 & 79 via preferably nuts 184 and preferably prevailing nuts 183. The axial connections 178,180,177,179 between rigid brackets 189, 190 and steering elements 187, 188 is showed in in FIG. 23; a section view of the right side of the axial connection illustrated by a section view 195 and a detailed view 196. The said right side section view is mirrored identical to the left side which is not shown in FIG. 23. The rigid bracket 189 is axial connected to steering element 187 in joint 177 & 179. Connecting joint 177 is comprised by; a connection shaft 201, a preferably steel bearing part 198, a preferably washer 197 and a preferably prevailing nut 205 secured to ridged bracket 189. Steering element 187 is preferably press fitted to preferably L-shaped preferably polymer bearing 199. Steering element 187 with bearing 199 is rotating around steering axis 14. Connecting joint 179 is comprised by; a connection shaft 202, a preferably steel bearing part 207, a preferably washer 206 and a preferably prevailing nut 181 secured to rigid bracket 189. Steering element 187 is preferably press fitted to preferably L-shaped preferably polymer bearing 204. Steering element 187 with bearing 204 is rotating around steering axis 14. Connection between steering rods 80, 89 and steering elements 187, 188 is connected with pivot joints 73 & 97.

Alternative embodiment 176 for connection method of the resilient elements 56, 62 to top- and bottom rigid structure 63, 79 is shown in FIG. 22. The connection comprises the resilient elements 56, 62 where rod 104 is connected, preferably with a thread from rod 104 to pivot joint 191, 192. Furthermore rod 113 is connected, preferably with a bolt to pivot joint 193, 194.

In view of the wide variety of embodiments to which the principles of the invention can be applied, it should be apparent that the detailed embodiments are illustrative only and should not be taken as limiting the scope of the invention. The claimed invention includes all such modifications as may come within the scope of the claims and equivalents thereto.

The invention claimed is:

1. A multi-wheeled tilting vehicle, comprising:
   a tilting mechanism for the multi-wheeled tilting vehicle having a longitudinal main frame and at least one rear wheel, said main frame being tiltable from side to side defining a range of movement,
   and
   two side wheels each having a center plane and a pair of wheel axis elements being connected to said wheels, said tilting mechanism comprising:
   a pair of steering elements adapted to be connected to the wheel axis elements,
   said steering elements further comprising a steering aggregate adapted for being connected to said main frame and controlling the position of the side wheels,
   said tilting mechanism further comprising a resilient member operably secured to said tilting mechanism,
   a parallelogram structure having a floating top and bottom rod each comprising two ends, laterally spaced from each other, and a pair of connecting rods arranged in each end of the top and bottom rods,
   said top and bottom rods having three pivot joints, one in each end and one at the center, and
   said top and bottom rods being arranged to pivot about said pivot joints at the center and adapted for being connected to said main frame by said pivot joints at the center,
   said connecting rods being pivotally connected to said pivot joints at each end of said top and bottom rods, wherein
   each of said steering elements defines a steering axis, having an angle to said center plane of the wheels, and said steering elements being connected to said connecting rods so that the steering axes intersect at least said pivot joints at the ends of the top rod,
   wherein said resilient member comprises a pair of resilient elements operably positioned between said top and bottom rod on each side of the main frame and an upper portion of each of said resilient elements is directly connected to a corresponding portion of said top rod of said parallelogram structure.

2. The multi-wheeled tilting vehicle according to claim 1, wherein said steering axes, when viewing said wheel from a side, forms an angle with a vertical imaginary line at the center of the wheel.

3. The multi-wheeled tilting vehicle according to claim 2, wherein said angle is positive.

4. The multi-wheeled tilting vehicle according to claim 1, wherein said resilient elements comprise pair of extension springs operably secured to the tilting mechanism through two pivot points and with an adjustment element to operably extend the springs.

5. The multi-wheeled tilting vehicle according to claim 1 wherein said steering axis and the center plane of said two side wheels will always intersect.

6. The multi-wheeled tilting vehicle according to claim 5, wherein said steering axis and the center plane of said wheels intersect at a point on the ground plane.

7. The multi-wheeled tilting vehicle according to claim 1, wherein the steering axes and said center planes of said wheels will have a distance to each other at the ground plane while intersecting at a point below the ground plane.

8. The multi-wheeled tilting vehicle according to claim 1, wherein said connecting rods each define an imaginary axis so that said steering axis forms an angle with said imaginary axis of said connecting rods.

9. The multi-wheeled tilting vehicle according to claim 1 comprising an auxiliary motor.

10. The multi-wheeled tilting vehicle according to claim 9, wherein said auxiliary motor is an electric motor.

11. The multi-wheeled tilting vehicle according to claim 9, further including
a platform structure connected to said main frame, and
a stabilization mechanism pivotally connected to said platform structure.

12. The multi-wheeled tilting vehicle bicycle according to claim 11, further including
a compartment element operably secured to said platform structure and/or said main frame, wherein said compartment element is an open or closed compartment element,
a door in the front of said compartment element comprising a locking mechanism,
a frame in the top of the compartment element,
a means of seating comprising a back element, and
a room for storage arranged behind said back element.

13. The multi-wheeled tilting vehicle according to claim 9, wherein said vehicle is a three-wheeled vehicle.

14. The multi-wheeled tilting vehicle according to claim 1, wherein each resilient element includes an upper portion disposed outwardly from a lower portion.

15. The multi-wheeled tilting vehicle according to claim 1, wherein the parallelogram structure includes a pair of horizontally aligned top rods and a pair of horizontally aligned bottom rods.

16. A multi-wheeled tilting vehicle, comprising:
a tilting mechanism for the multi-wheeled vehicle having a longitudinal main frame and at least one rear wheel, said main frame being tiltable from side to side defining a range of movement,
and
two side wheels each having a center plane and a pair of wheel axis elements being connected to said wheels, said tilting mechanism comprising:
a pair of steering elements adapted to be connected to the wheel axis elements,
said steering elements further comprising a steering aggregate adapted for being connected to said main frame and controlling the position of the side wheels,
said tilting mechanism further comprising a resilient member operably secured to said tilting mechanism,
a parallelogram structure having a floating top and bottom rod each comprising two ends, laterally spaced from each other, and a pair of connecting rods arranged in each end of the top and bottom rods,
said top and bottom rods having three pivot joints, one in each end and one at the center, and
said top and bottom rods being arranged to pivot about said pivot joints at the center and adapted for being connected to said main frame by said pivot joints at the center,
said connecting rods being pivotally connected to said pivot joints at each end of said top and bottom rods, wherein
each of said steering elements defines a steering axis, having an angle to said center plane of the wheels, and said steering elements being connected to said connecting rods so that the steering axes intersect at least said pivot joints at the ends of the top rod, and a first portion of each of said steering elements is horizontally aligned with a portion of the top rod when the multi-wheeled vehicle is in a non-tilted position,
wherein said resilient member comprises a pair of resilient elements operably positioned between said top and bottom rod on each side of the main frame.

17. The multi-wheeled tilting vehicle according to claim 16, wherein a second portion of each of said steering elements is horizontally aligned with a portion of the bottom rod when the multi-wheeled vehicle is in a non-tilted position.

* * * * *